May 29, 1951  L. W. ALVAREZ ET AL  2,555,101
AIRCRAFT CONTROL SYSTEM
Filed Feb. 25, 1944  11 Sheets-Sheet 7
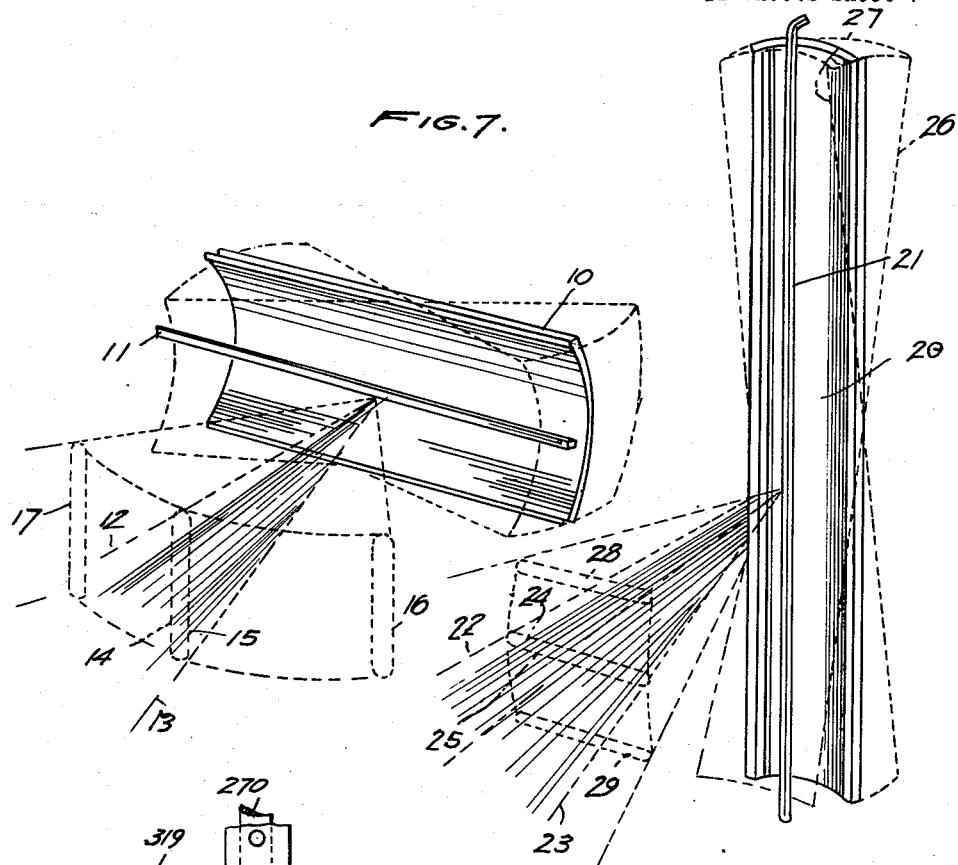
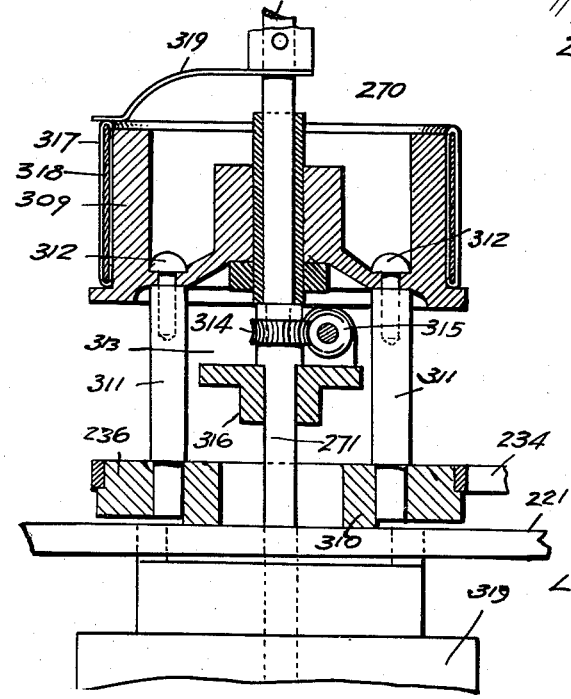
INVENTORS
LUIS W. ALVAREZ
LAWRENCE H. JOHNSTON
BY
William D. Hall.
ATTORNEY

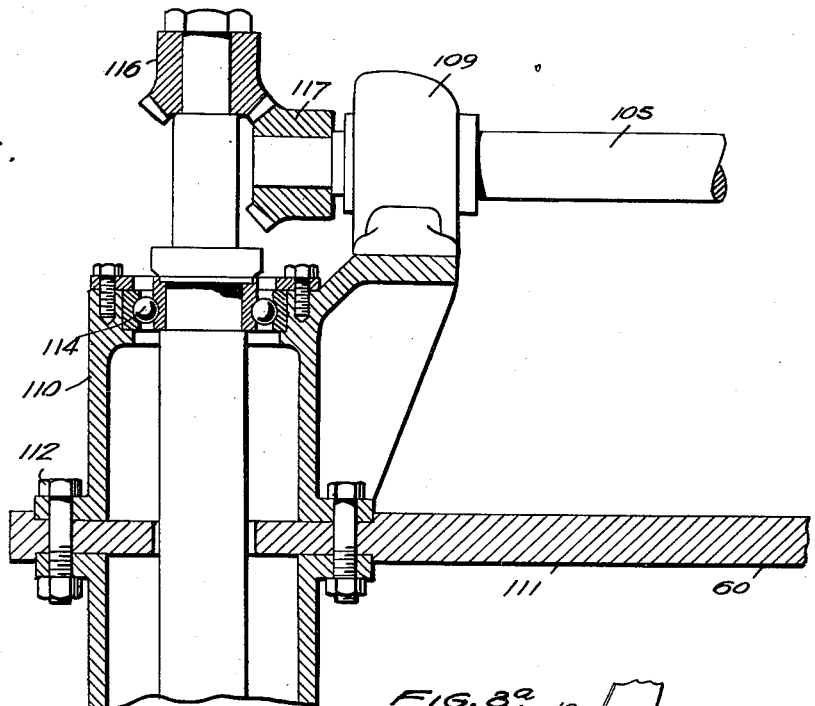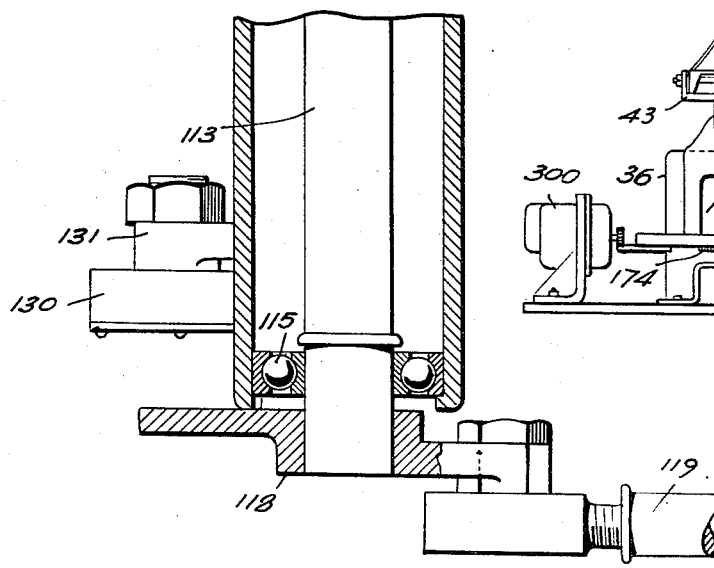

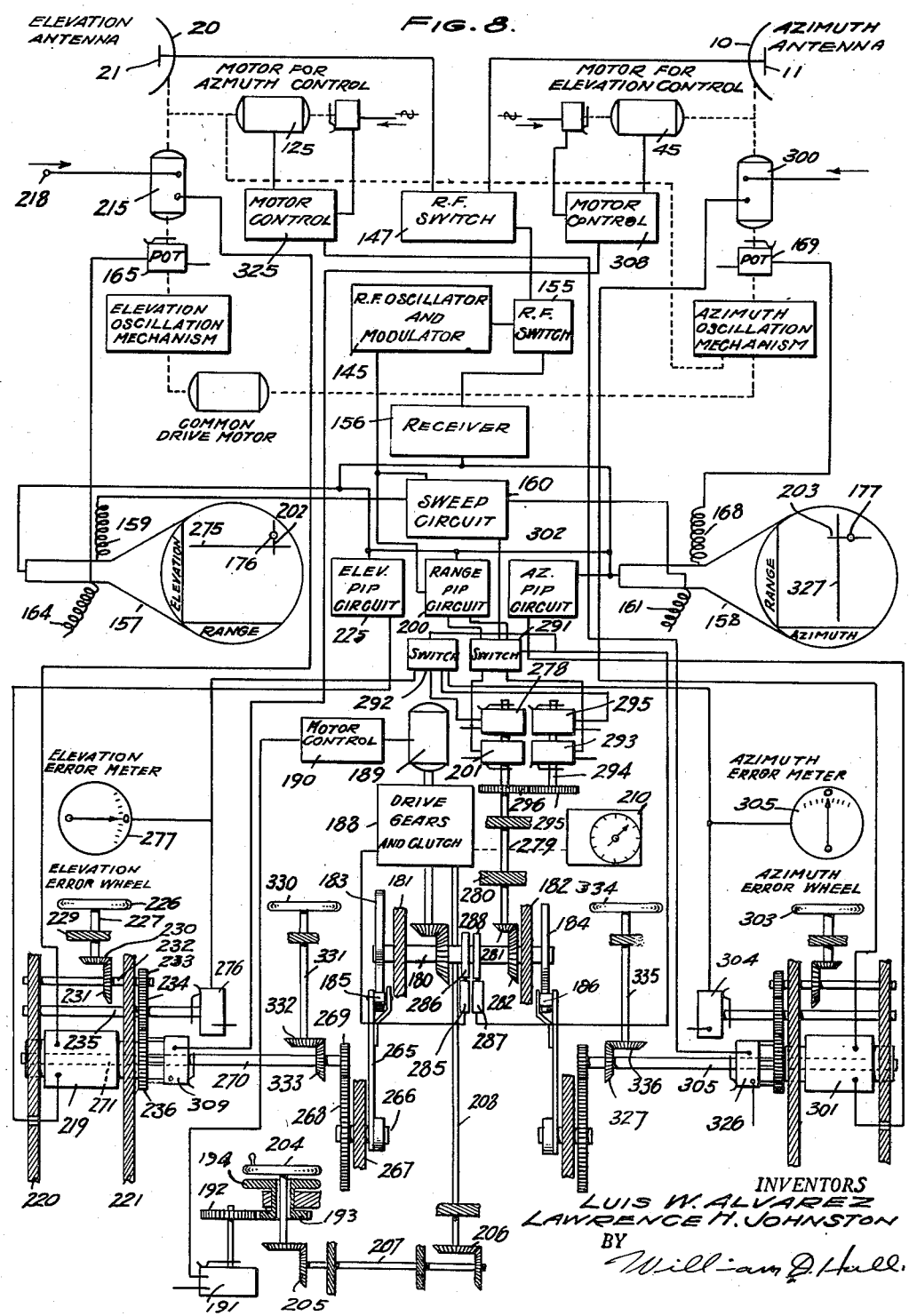

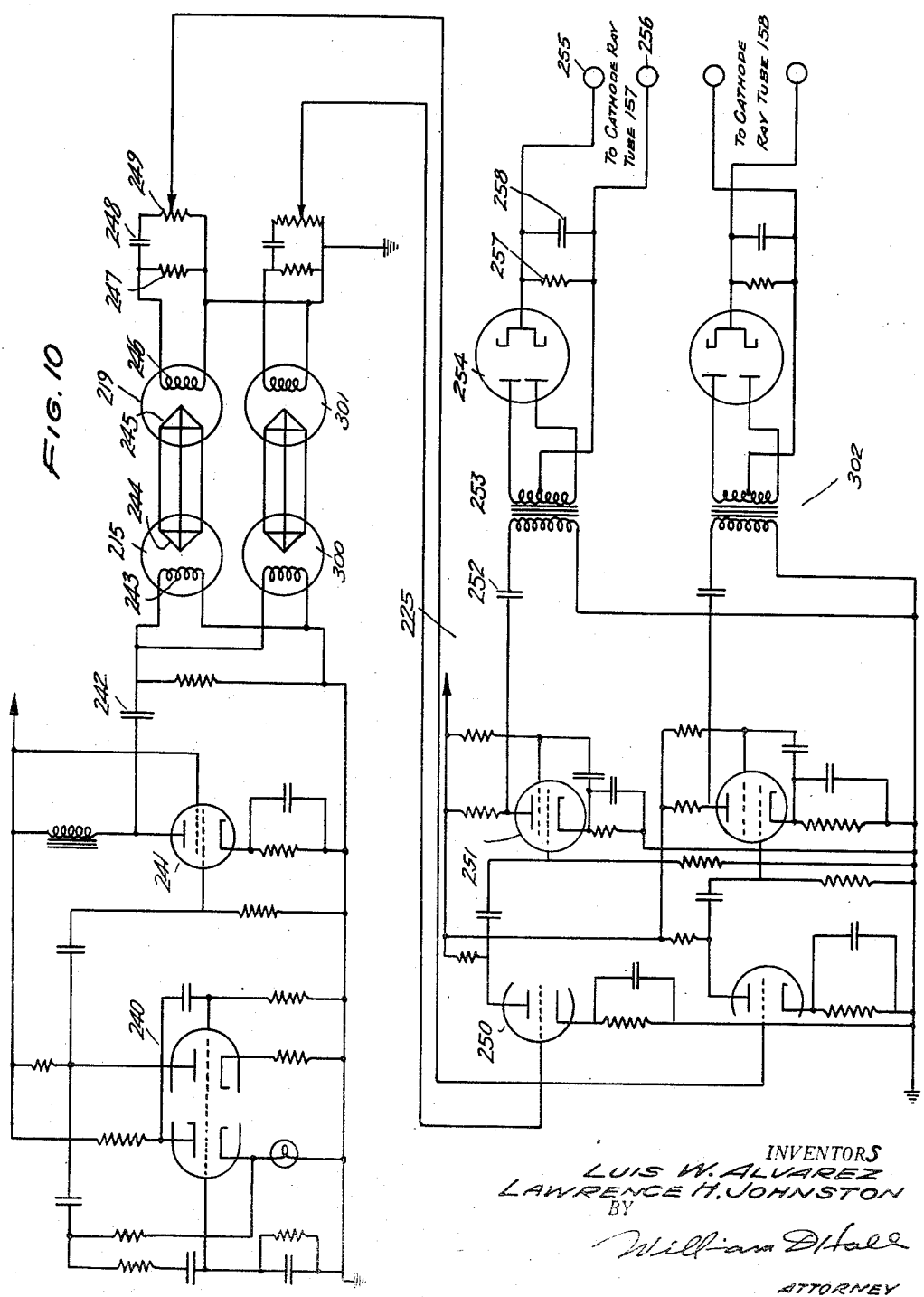

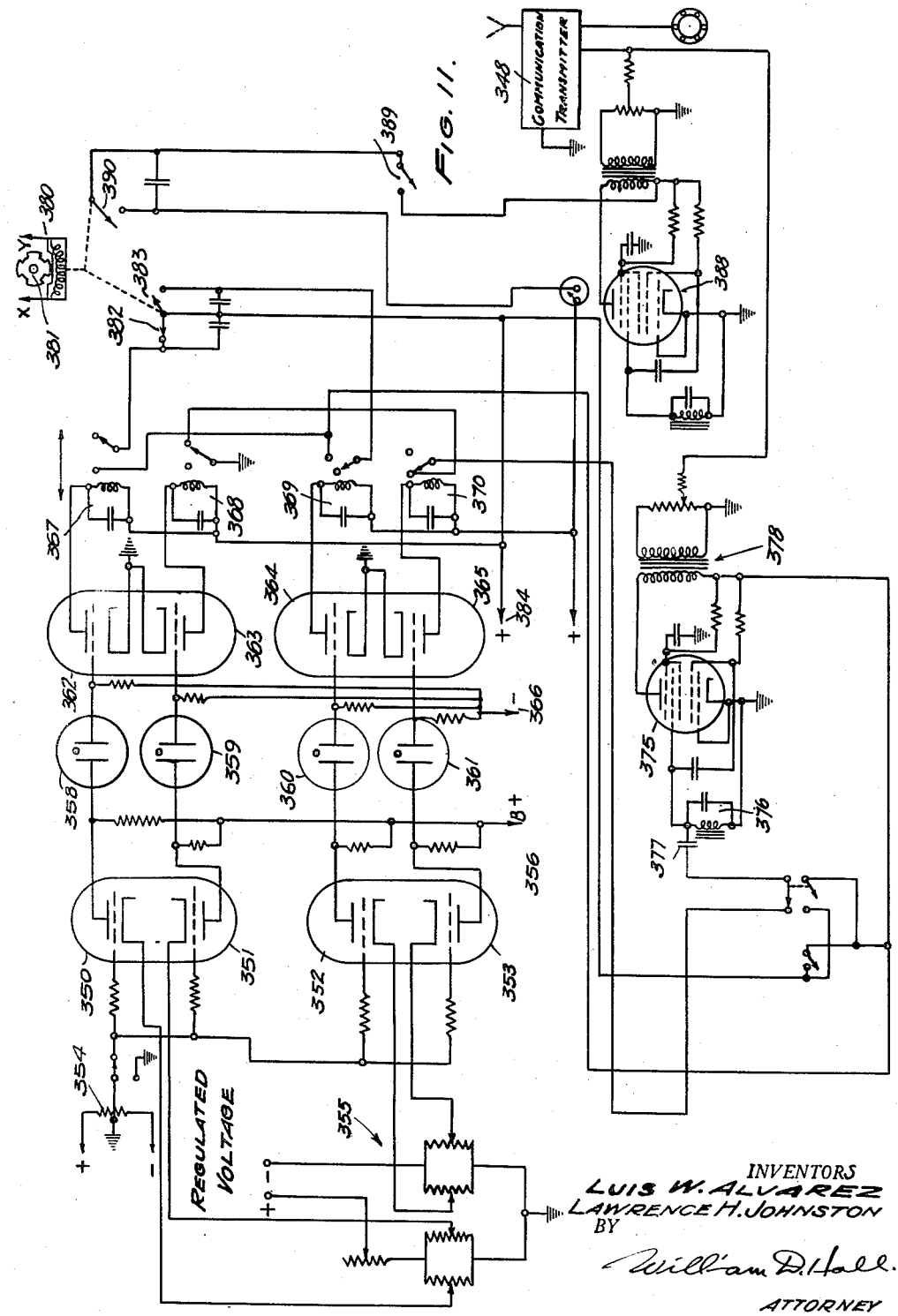

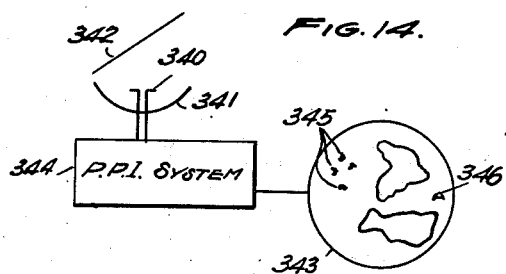
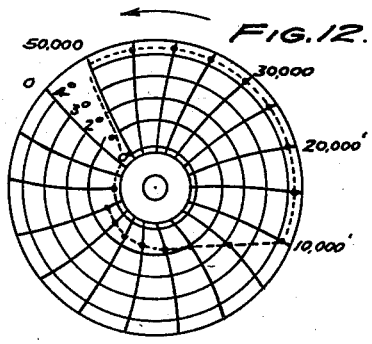
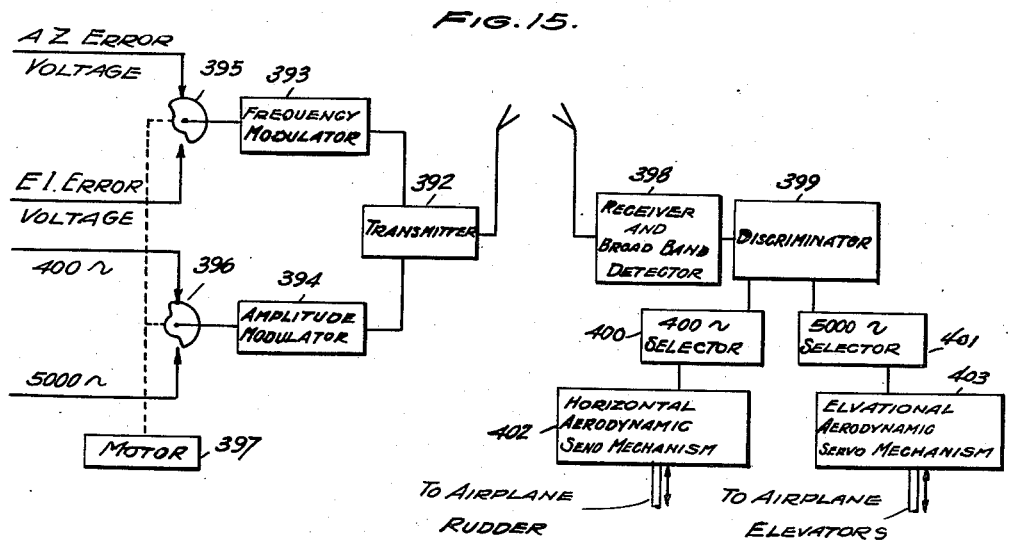
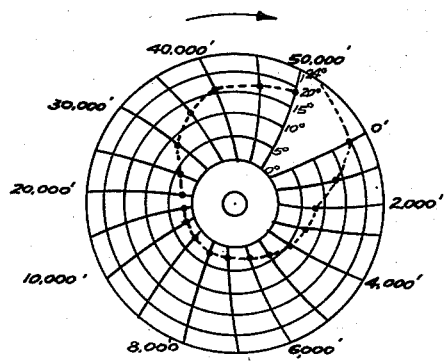

Patented May 29, 1951

2,555,101

UNITED STATES PATENT OFFICE 2,555,101

AIRCRAFT CONTROL SYSTEM

Luis W. Alvarez and Lawrence H. Johnston, Belmont, Mass., assignors to the United States of America as represented by the Secretary of War Application February 25, 1944, Serial No. 523,878

30 Claims. (Cl. 343—6)

This invention relates to an aircraft control system and more particularly to an aircraft system controllable from a relatively fixed station.

At present, there are blind approach systems in which the control is vested in the flyer. In such systems the landing field has means for radiating electromagnetic waves in patterns to define gliding paths. The aircraft to be landed is equipped with suitable means sensitive to the radiated patterns to show whether or not the aircraft is on the prescribed glide path. The pilot must of course actually guide the craft in response to the instrument indications.

The above systems require not only elaborate gear on the ground for creating glide paths but also elaborate instruments in the plane to cooperate therewith and indicate the existence of such glide paths to the plane personnel. Thus reliance is placed upon proper operation of airborne gear. In addition, it is necessary to provide a thorough training course for a pilot so that general use of such systems is impossible.

In addition to the above, present blind approach systems only provide cooperation between airborne gear and a radiated glide path and have no means to perform a ground controlling function; i. e. approach of a number of craft in suitable order. It is clear that conditions necessitating blind approach also require collision prevention between two or more flying craft.

The invention described herein provides a system in which special airborne gear is entirely eliminated. All apparatus pertaining to blind approach and landing is at a relatively fixed station with the usual advantages of such installations. Control is exercised from such a station and it is only necessary that communication with the plane be carried on. The pilot may be directed where and how to fly and be guided to a safe approach or landing. Very little instruction to a pilot is necessary before landing operations are routine and in emergency, any plane having radio reception may be landed.

As a rule it is desirable to make the approach in a straight glide path. If the glide angle is substantial then it is generally desirable to level off just before actual landing. In some cases the levelling may be omitted but a rough landing will result. Except in the worst weather, a ceiling of 100 feet or so will generally exist so that a blind approach only is necessary. However it is possible to communicate a levelling instruction for a blind approach and landing.

The fundamental basis upon which the invention operates involves the determination of distance by the time taken by electric waves travelling a definite course. It is well known that electric waves at suitably high frequencies may be directed from an antenna or radiator and travel outwardly in space. Any physical object in the path of such waves results in an echo which is reradiated into space from the object or target. Assuming the energy in the waves and sensitivity of apparatus are sufficient, the reflected echo from a target may be received at or near the original antenna. For all practical purposes, we may assume that radiated waves travel from the antenna with the speed of light and after instantaneous reflection from the target return with the speed of light. Hence the time interval between the emission of original energy by the antenna and reception of echo energy by or near the antenna may be taken as a direct function of the distance between antenna and target.

In the practical operation of such a system, the time unit is a microsecond or one millionth part of a second. Since the rediated energy must travel the course twice, out and back, it is evident that the time of travel is twice that normally due to a single journey between antenna and target. In practice a short burst or pulse of energy is emitted at the antenna and thence the system is dead, as far as transmission is concerned, for a suitably long time interval within which echo energy may return. Since radiated energy begins to be emitted at the beginning of the pulse, it is clear that unless the pulse is short, the minimum range will be adversely affected. The time interval between the end of one pulse and beginning of the next pulse must be long enough to accommodate echo travel over the maximum range desired.

Due to the high velocity of such electric waves, about 187,000 miles per second, and the short duration of each pulse, of the order of one or two microseconds, it is possible to send out properly spaced pulses at the rate of about two thousand or more times per second. Since each pulse and echo is a complete range measuring cycle, it is evident that the range measuring system has sufficient flexibility to accommodate aircraft speeds.

The determination of azimuth may involve scanning movements of the field pattern of an antenna system. Such scanning movements may be effected either by physical movement of the antenna system or by electrical switching means involving successive use of different antenna system elements. Scanning may occur at the rate of four or more times per second. Hence every fourth of a second complete data on the position of a plane is obtainable. Even with present day air speeds, the position of a flying plane may be given substantially continuously.

The data is presented by the above range systems on the fluorescent screen of a cathode ray tube. Thus a trace may start across the screen coincident with the emission of radiant energy. The return echo is shown on the screen at a distance from the start of the trace. Hence the physical distance between the trace beginning and echo is a direct function of target distance. Inasmuch as such radar ranging systems are well known in the art, detailed description thereof is deemed unnecessary.

In its more general aspect, the invention provides a search system operating on radar principles and mounted at or near the landing station. With proper scanning action, the azimuth, range and elevation of one or more planes in air may be obtained. Since radar locates fixed obstructions also, the data on such obstructions to aerial navigation may also be given. The data is presented on the fluorescent screens of cathode ray tubes as a substantially continuous trace so that an operator may, on inspection, determine the course of the landing. If the landing operation is proceeding in some unsatisfactory manner, the operator may give directions to the plane to alter its course in one or more particulars. Thus the landing operation may proceed under supervision from the ground station.

Because the data presentation of the plane in air is made as a trace on a screen it is possible for a trained operator to bring in a plane to a landing by interpreting the data. Thus the operator will know what parts of the screen show dangers to a plane or may actually see the data for the plane being landed and for other dangers.

However, it is desirable for the system to do its own interpreting, and to present directing data, which may be communicated to the plane without change. It is obvious that the time lag between presentation of plane data and actual correction of plane course should be reduced to a minimum. To this end means are provided for indicating correction data. Thus if an operator is used, no interpretation of data is necessary. Immediate communication of such data may be given to the plane.

The advantages of a system of this character over the prior art are substantial. For one thing, the concentration of all blind flying gear at relatively fixed stations permits elaborate measures to be taken to insure continuity of service. The absence of special airborne gear greatly reduces cost, increases safety and permits blind landing by all craft having radio receivers. Finally the landing party is fortified by the assurance that the only reliance in the aircraft is upon a radio receiver and that a collision-free, controlled, blind landing is possible. Because radio receivers are highly reliable, such a blind landing system will go far toward removing the anxiety associated with the operation of present day blind flying systems. Moreover, since all commercial and military planes are always equipped with radio receivers and transmitters, they all become automatically equipped for immediate use of the GCA system (ground-controlled approach) disclosed in this application. Therefore there is no new equipment to install in the planes, or go wrong, or to be serviced. Also, the pilot has all his thinking done for him by experts on the ground who possess complete information concerning prevailing landing conditions at any particular airport.

The radar presentation of a flying plane is accomplished by means of the form of a moving luminous spot on the screens of several oscilloscopes. Since a plane in flight involves three variables, azimuth, range and elevation, two separate screens will be desirable. It is possible to present a third variable on a screen by control of spot intensity or size, and it is contemplated that this invention may be modified so that one screen may be used. A radar search unit may supply one screen with azimuth and range data while another search unit may supply the other screen with elevation and range data. As disclosed herein, two complete radar units are unnecessary. By rapid switching from one to the other a substantial part of each unit may be common to both.

The path of an ideal landing, which is represented on the oscilloscope screens by a moving spot, should be known to the operator so that he could compare the position of the plane's image on the same screen with the ideal position. The luminous spot on each screen, representing an instantaneous ideal position on the ideal landing path, follows a prescribed line. This prescribed line, as it appears on the oscilloscope, may have any configuration, either straight or curved, and will depend on such screens factors as ideal glide path for plane, distortion in the cathode ray tubes, and in associated circuits, weather conditions, etc. In the event that the prescribed screen line is not straight, then means are provided for presenting an indication of a prescribed path. A manual control is provided for causing coincidence of prescribed and actual data at any instant, and such control is calibrated in terms of distance to show the error between actual and prescribed data. The actual and prescribed data is shown on the same screen.

This error data is communicated to the flying plane in order that course corrections may be made. Such error data as a rule may be one or two of four possibilities, these four being up and down, right and left. A levelling-off signal may also be provided.

Since the data presentation involves the travel of a spot along some reference line, it is necessary to move the spot if a prescribed path trace is to be generated. The simplest way to determine the shape of a glide path on each screen is to note the screen trace for a perfect approach and landing made under good flying conditions. Then suitable time controlled means may be provided for artificially duplicating this screen trace. As disclosed here, this means includes, among other apparatus, cams or record blanks which may be considered as a storage record for prescribed data presentation. Such record means may not be necessary where the operators are highly skilled, or where the screen trace becomes a straight line.

In its broadest aspect the invention may be used for guiding airplanes in flight along some particular predetermined path, as, for instance, a predetermined path down to a landing runway at a landing field, or on to the deck of a ship, or upon the surface of water. A control station is provided which is preferably, although not necessarily, located in close proximity to the landing runway upon which incoming airplanes are to land. By means of radio-echo detection apparatus, as indicated above, this control station locates a single airplane or a group of airplanes in space, and this airplane—or one of the airplanes where a group of airplanes are waiting to come in—is contacted by means of ordinary radio communication systems. Then the pilot of this airplane is told verbally how to maneuver into a position for approaching the landing runway and he is then "talked down" until the wheels of the plane touch the runway.

The control system of this invention may take charge when planes in air are within a predetermined range, say 50,000 feet as an example. In this respect the range limit of this GCA system is equal to the range limit of radar systems in general.

These record blanks may be paper disks upon which the azimuth and elevation curves are plotted, or, as in the preferred form of the invention, they may be cams which are engaged by cam followers. The record blanks are rotated at a slow speed corresponding to the speed of the plane, the arrangement being such that the blanks make slightly less than one complete rotation while the airplane is traveling from a range of 50,000 feet, for instance, to the runway.

The radio-echo detection apparatus presents continuously an indication of the airplane on two cathode ray tubes, one presenting an indication of the incoming airplane as a function of elevation and range, while the other presents the indication of the airplane as a function of azimuth and range. Associated with the elevation cathode ray tube is an elevation error meter and associated with the azimuth cathode ray tube is an azimuth error meter. Under control of suitable mechanism are two pulse or pip generators one of which produces a short, substantially rectangular voltage pulse used for producing a short, bright line on the elevation cathode ray tube at the elevation of the desired glide path and at the range corresponding to the range of the plane, this line gradually approaching together with the plane zero elevation as the range of the airplane diminishes. The other pulse or pip generator produces a short bright line on the azimuth cathode ray tube at the desired azimuth of the instantaneous range, so that this line gradually changes in azimuth as the desired airplane glides down along the ideal path and its azimuth on the glide path changes. The oscilloscopes are also provided with the range marker signals, which are generated by a range pip circuit; the so-called pips corresponding to a series of voltage pulses, each pulse being of very short duration. The time or phase of these pulses is controlled by the ideal path record or the ideal path cam, the cam or the record being continuously rotated by an electric motor at a rate corresponding to the rate of approach of the air field by the descending airplane. Therefore the range pips produce short, bright range lines on both of the cathode ray tubes at a range corresponding to the range of the incoming plane; the plane's range position, insofar as the GCA system is concerned is represented by the angular position of the record blank.

When the airplane first reaches, say, 50,000 feet range, the range marks on both cathode ray tubes are caused manually to coincide with the representation of the airplane. An operator may control the mechanism so that the range markers on the two cathode ray tubes maintain coincidence with the representation of the airplane. The elevation and azimuth lines produced on the cathode ray tubes will then have the positions on the two cathode ray tubes as determined by the operator or record blanks if used. A handwheel is associated with each of the cathode ray tubes, and an operator turns the elevation handwheel until the elevation marker is aligned with the representation of the airplane, which causes the meter associated with that cathode ray tube to rear the error of the airplane's position above or below the desired glide path in feet. Similarly, another operator turns the handwheel associated with the azimuth cathode ray tube to move the azimuth marker line into alignment with the representation of the airplane, whereupon the meter associated with the azimuth cathode ray tube will read the error of the airplane's position in feet right or left off the center of the glide path. A dispatching operator can then give instructions over the communication system to the pilot of the incoming airplane to fly up or down or right or left until the meters upon the corresponding adjustment of the handwheels, read zero, at which time the airplane will be on the glide path. The GCA system is also provided with a time meter which is associated with the record blank operating mechanism; this meter furnishes directly the time required for the airplane to touch the runway, and the dispatch operators can give the pilot this time in so many "minutes to touch."

It is therefore an object of this invention to provide ground-controlled approach system for facilitating completely "blind airport landing" of airplanes or other flying machines, the system being capable of furnishing continuously the position of an incoming plane in terms of its range, azimuth and elevation with respect to the airport, landing area, or their runways.

It is an additional object of this invention to provide a ground-controlled approach system for directing approach, and safe landing of any flying craft by continuously tracking this craft with a special radar system, and by communicating to the pilot of this craft, over a separate radio channel, the results of such tracking.

Still another object of this invention is to provide a new method of guiding any flying craft or moving, or floating objects to their point of destination by obtaining their position with respect to this point in terms of azimuth, range and elevation solely by means of signals from said point, and by transmitting this position over a separate radio channel, to this craft.

Another object of this invention is to provide special mechanical antenna-scanning systems particularly useful for obtaining proper scanning of space with energy-radiating means of a ground-controlled approach system.

Still another object of this invention is to provide a system for completely automatic landing of flying crafts at the points of their destination.

For a better understanding of the invention, as well as other objects and features thereof, reference is had to the following detailed description to be read in connection with the accompanying drawings wherein like elements are identified by like characters. Referring to the drawings, Fig. 1 is a perspective view of an airfield showing the trucks which house the apparatus of the invention arranged in position for guiding an airplane to a blind landing;

Fig. 3a is a detail of a potentiometer mounting.

Fig. 6 is a sectional elevation view of a portion of the mechanism of Fig. 3 taken on the line 6—6 of that figure;

Fig. 7 is a schematic perspective view of the electromagnetic antenna systems indicating the cross-sections of the electromagnetic beams which are produced by the antennae and the oscillating movement of those beams;

Fig. 8 is a schematic representation of that part of the entire system which locates the airplane in space and compares its position to the predetermined glide path, showing the mechanism for controlling the movements of the electromagnetic beam antenna systems, the mechanism for producing the glide path, the cathode ray tube where the representation of the incoming airplane appears, and the error meters which indicate the amount the incoming airplane is off of the predetermined path;

Fig. 8a is a fragmentary elevational view of the support for the horizontally oscillating antenna system;

Fig. 9 is a longitudinal sectional view through one of the motor control potentiometers which controls the center of oscillation of one of the electromagnetic beams, showing the manner in which the body of the potentiometer is rotated with the stator of a "selsyn" motor;

Fig. 10 is a circuit diagram of the pip generator circuit by means of which an operator may produce a marker on the face of a cathode ray tube which when moved to align with the representation of the incoming airplane will produce an error reading on a meter to give the distance of the airplane off of the predetermined glide path;

Fig. 11 is a circuit diagram of an auxiliary signalling system by means of which the pilot of the airplane may receive an audible signal indicating whether or not he is off of the glide path;

Figs. 12 and 13 are elevation and azimuth charts, respectively, showing the manner in which the elevation path and the azimuth path may be charted and the cams cut which automatically produce the glide path;

Fig. 14 is a schematic diagram of the separate radio-echo detection apparatus for searching the sky and locating large numbers of airplanes which are to be landed one at a time by means of the apparatus of Fig. 8;

Fig. 15 is a block diagram of an alternative system by means of which the control of the airplane may be taken completely away from the pilot and the landing made entirely automatically.

Figure 1:
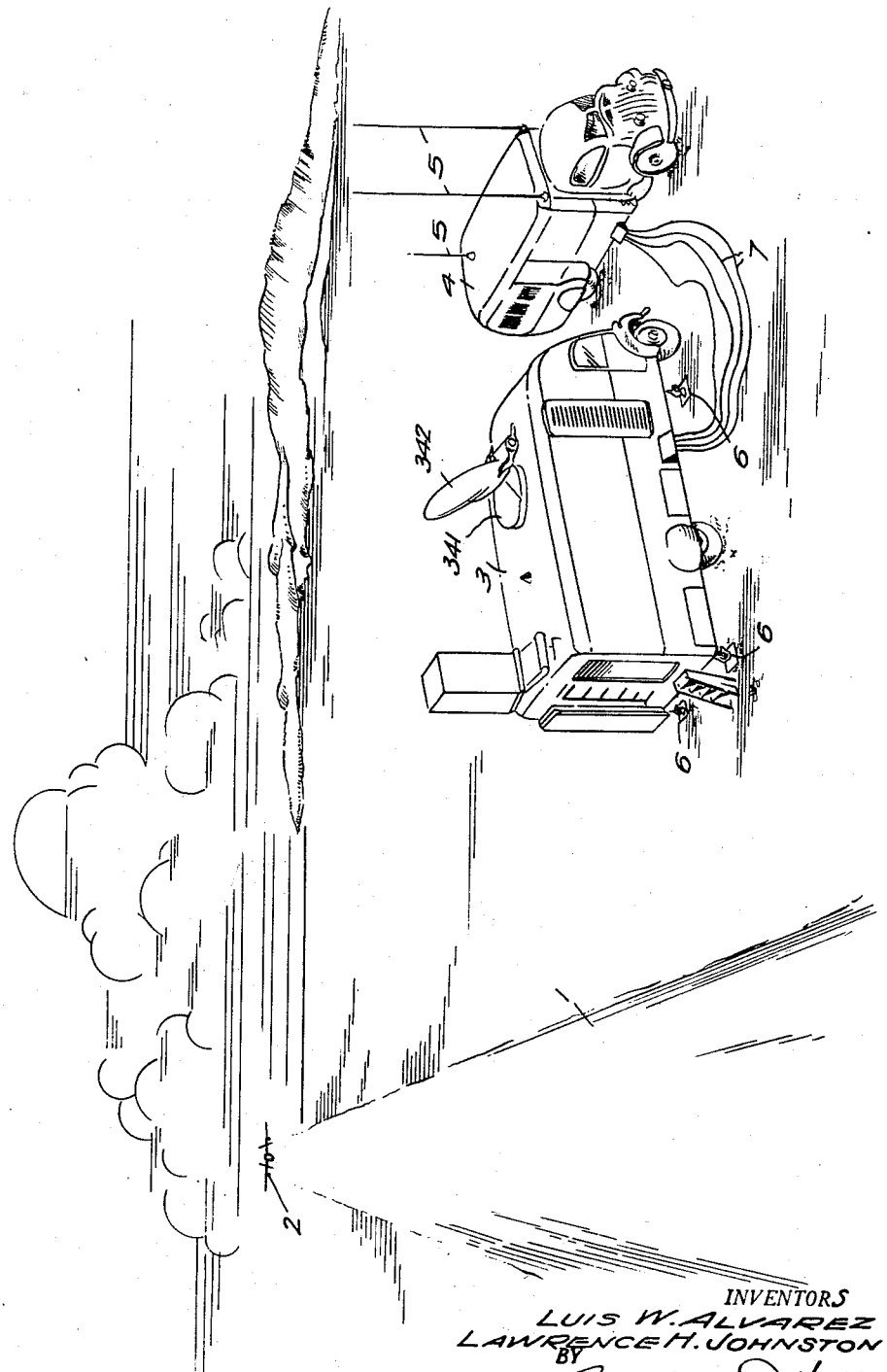

In Fig. 1 a perspective view of a landing field is shown with a runway 1 and an incoming airplane 2. Two trucks 3 and 4 are shown in positions near the runway 1; these trucks contain the complete apparatus of the invention, and constitute the control station; truck 3 contains the radio-echo detection antenna systems and the power supply equipment, and truck 4 contains the control room provided with windows overlooking the runway and containing also the communication equipment. The communication equipment is provided with antennae 5, as indicated. The truck 3 may be provided with suitable leveling jacks 6 so that the radio-echo detection antennae may be properly leveled. Suitable connecting cables 7 are provided between the two trucks for making the necessary electrical connections therebetween.

The antennas of the radio-echo detection apparatus scan a predetermined portion of space, and accurately locate the range, elevation, and azimuth of the incoming airplane. The mechanism for mechanically oscillating and controlling these antennas will be described first, and this will be followed by a description of the electrical system. There are two radar antenna systems, and they are shown in perspective in Fig. 2.

In order to obtain the accurate range azimuth, and elevation of the incoming airplane, the field in space may be scanned by an electromagnetic beam in various ways in accordance with known procedure of the radio-echo detection art. For our present purpose we prefer to scan the field with a beam of electromagnetic radiation having an energy distribution pattern in the shape of a fan, being as narrow as possible in one direction, and spread out through a considerable angle in the direction perpendicular to the first direction. Such a beam may be produced in a known manner by an elongated reflector 10 having a parabolic cross section and equipped with a slotted wave guide which extends parallel to the longitudinal axis of the reflector and is placed on its concave side, with the wave-guide slots facing the reflector. Such an arrangement of the reflector and of the wave guide may be made to produce an electromagnetic beam having a radiation pattern defined in a direction perpendicular to the axis of the reflector, as by the dotted lines 12 and 13 of the reflector 10 of Fig. 7 and in a direction parallel to the axis of the reflector by the dotted lines 14 and 15.

It will be seen from an inspection of Fig. 7 that such a beam is fan-shaped and that such a beam may be caused to scan in the plane of the axis of the reflector by moving the entire reflector and wave guide assembly, as by oscillating this whole antenna assembly about a line which is substantially parallel to the plane of the electromagnetic beam and substantially perpendicular to a plane passing through the axis of the reflector and the center of the radiated beam. Thus, when antenna 10—11 is oscillated from one dotted line position of Fig. 7 to the other, the electromagnetic beam will be caused to sweep back and forth between the cross-sectional positions 16 and 17.

The above-mentioned beam is the azimuth antenna beam scanning in a horizontal plane. It is made as narrow as possible in azimuth to obtain accurate azimuth determinations. However, the elevation angle of this beam i. e., the angle between the lines 12—13 need not be narrow since the elevation determinations are made by a second antenna 20—21, which is the elevation antenna.

The elevation antenna has a fan-shaped beam the plane of which is at right angles to the azimuth beam 12—13. The elevation antenna comprises an elongated, parabolic reflector 20 provided with a slotted wave guide feed 21 positioned parallel to the axis of the reflector. The elevation antenna 20—21 is positioned vertically to produce a beam having a horizontal spread defined by the dotted lines 22 and 23, and a vertical spread defined by the dotted lines 24 and 25. This antenna may also be moved bodily, as indicated by the dotted lines 26 and 27 to cause the beam to sweep between the two extreme positions 28 and 29.

Thus the elevation beam is narrow in elevation and relatively wide in azimuth, which makes it possible to make accurate elevation angle determinations. The wide azimuth angle insures interception of an incoming plane with this beam.

The azimuth and elevation beams therefore, represent two fan-shaped beams with the fan centers located at the antennas. The azimuth fan lies in a vertical plane, and the elevation fan lies in a horizontal plane, with the azimuth fan fanning from side to side, and the elevation fan fanning up and down.

In a manner to be hereinafter described, the two antennas are caused to sweep 90 degrees out of phase with each other. In other words, the horizontally oscillating azimuth antenna is crossing the mid-point of its oscillation when the vertically oscillating elevation antenna is at one of its extreme positions. Each antenna continuously transmits a series of exploratory pulses only during a certain portion of its stroke, the arrangement being such that at any given instant, there is only one exploratory beam, either the azimuth or the elevation beam, sweeping through the field, the beams from the two antennas alternating as the antennas oscillate. In the disclosed arrangement the transmitter is connected to the azimuth antenna during the 0° to 90° and 180° to 270° portions of the 360° mechanical oscillatory cycle, and the elevation antenna is connected to the same transmitter during the remaining portions of this cycle.

Thus two generally fan-shaped scanning patterns are provided. Each scanning pattern may be considered as having a longitudinal axis, this being the line extending generally outwardly from the middle of the reflector in its mid-position. Thus both scanning patterns may be considered as being perpendicular to each other and having substantially coincident longitudinal axes.

Figure 2:
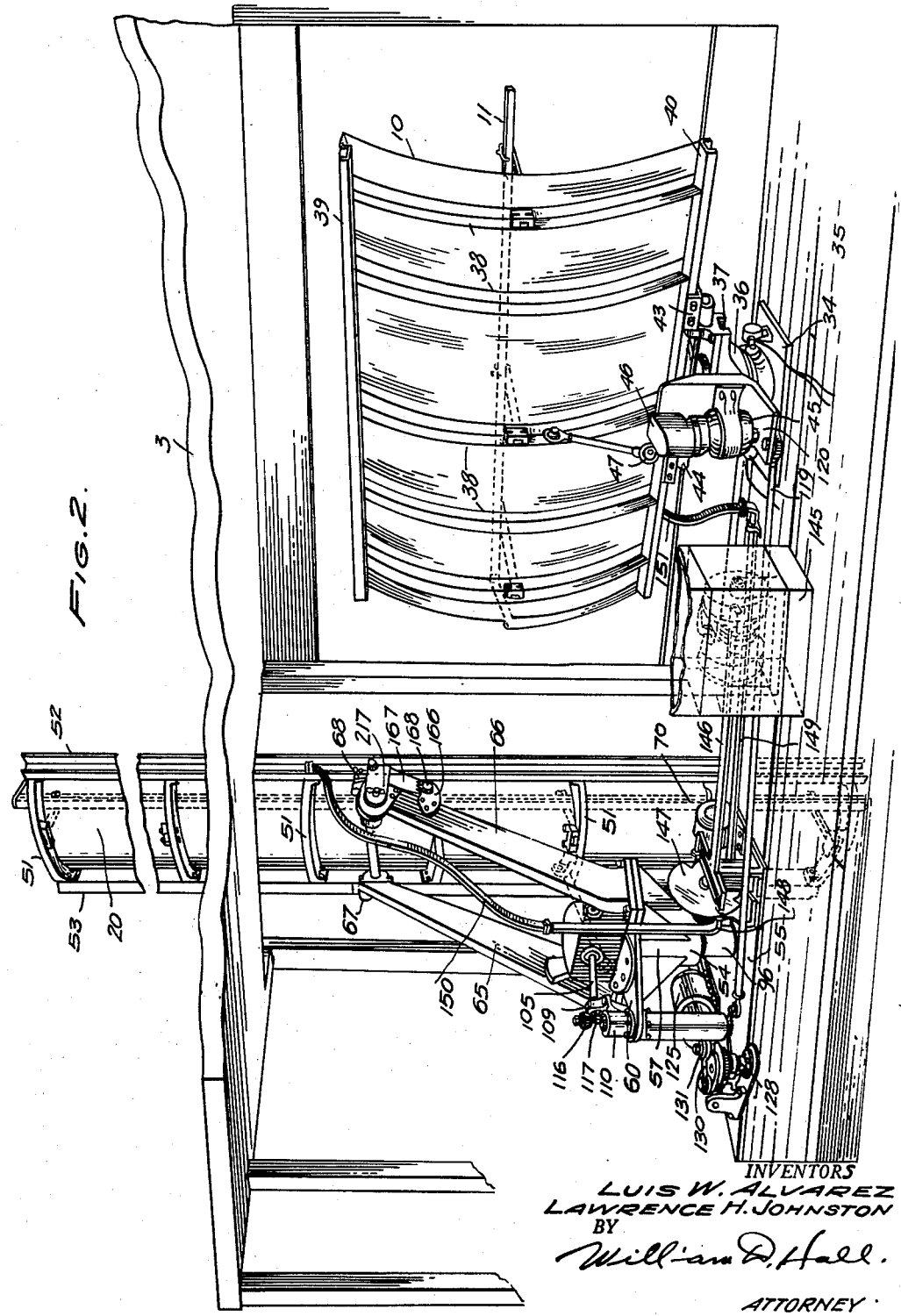
Fig. 2 is a perspective view of the electromagnetic wave antennae, the view being taken from inside of the truck which houses these antennae and portions of the truck being broken away in order to disclose the antennae and supporting mechanism.

The schematic representation of the electromagnetic beams of Fig. 7 represent the beams as viewed from outside of the truck looking towards the antenna systems. In Fig. 2 a more detailed perspective view of the antenna systems and supporting and controlling mechanisms is shown, with the observer looking from inside of the truck 3 and with portions of the truck broken away so that the mechanism can be seen. Here, the antenna system comprising the reflector 10 and wave guide feed 11 is shown mounted upon a base plate 34 fastened to the floor 35 of the truck, the base plate being provided with a suitable vertical bearing member 36 upon which is mounted a bracket 37 for supporting the reflector assembly 10—11. The reflector 10 is provided with reinforcing members 38 which are curved to fit the curvature of the reflector and which terminate in channel members 39 and 40 at the upper and lower edges respectively of the reflector. The lower channel member 40 is hinged to the bracket 37 by means of suitable hinges 43 and 44 so as to permit the reflector 10 to pivot about its lower edge and thus to alter the elevation of the beam projected by the reflector.

Movement of the reflector in this vertical plane may be affected by means of a driving motor 45, mounted on the bracket 37 and provided with suitable gear reduction mechanism in the housing 46, and a crank arm 47 the end of which is pivotally connected by means of a link 48 to the reflector 10, the upper end of the link 48 being pivotly connected, as indicated, to one of the reinforcing members 38. This motion in a vertical plane is independent of the oscillating motion of the reflector about the bearing 36 under control of mechanism to be later described.

Figure 5:
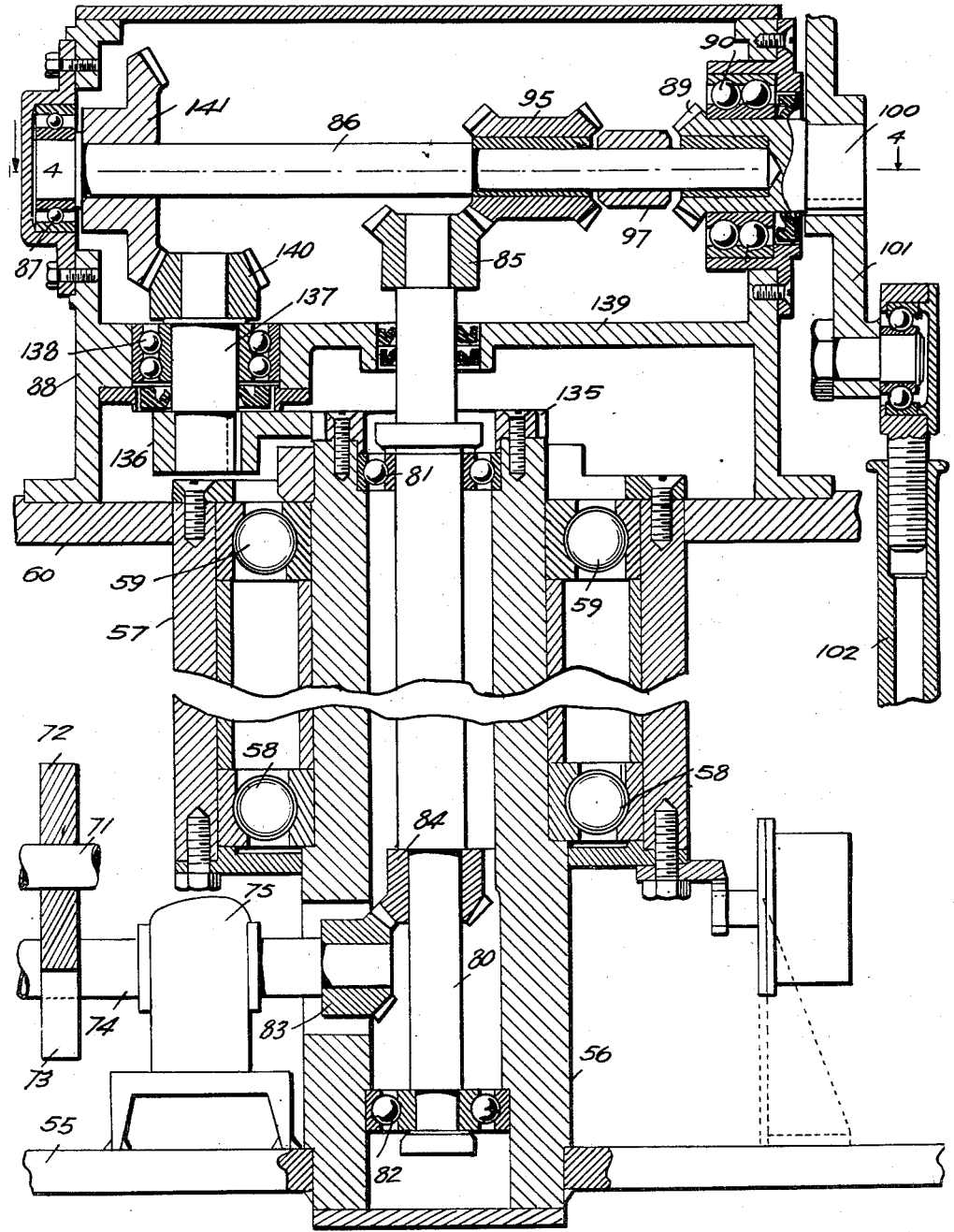
Fig. 5 is a sectional elevation view of the supporting pedestal for the vertically scanning antenna system taken on the line of 5—5 of Fig. 3.

The vertically oscillating reflector 20 is also provided with reinforcing members 51 which are curved around to the front of the reflector and terminate in channels 52 and 53. The reflector 20 is supported by means of bearing mechanism 54 which permits it to oscillate about a vertical axis through the center of the bearing member and also about a horizontal axis at about the center of the reflector in a manner subsequently to be described. The bearing mechanism 54 is mounted upon a bed plate 55, the upper surface of the plate being arranged flush with the floor 35 of the truck. The bearing mechanism comprises a cylindrical pedestal 56 rigidly secured to the base plate 55 (see also Fig. 5) upon which is rotatably mounted a larger cylindrical member 57 by means of ball bearings 58 and 59 (Fig. 5). A plate 60 extends outwardly from the upper end of the cylindrical member 57 forming a support for two arms 65 and 66 (Figs. 2 and 3) extending upwardly and outwardly at an angle and pivoted at their upper ends to brackets 67 and 68, respectively. These brackets are attached to the side channels 53 and 52 of the reflector 20. The reflector 20 is thus free to oscillate in a vertical plane about the bearings in the brackets 67 and 68, while the entire reflector and supporting mechanism can rotate about a vertical axis when the cylindrical member 57 is rotated on the pedestal 56.

This scanning action may take place at any suitable speed. In practice, we have found that about four complete scanning cycles per second is satisfactory.

For reasons to be later explained, it may be desirable to shift the center of oscillation of the horizontally oscillating beam and of the oscillating beam in a horizontal direction, and also to shift the center of the two oscillations vertically in a vertical direction. We have found in the present instance that it is unnecessary to shift the centers of oscillations in a vertical direction but it is desirable to shift these centers in a horizonal direction, and to accomplish this while the both antennas are oscillating. It is also desirable to produce the oscillating movement of both antennae by means of a single driving source, so as to maintain the proper phase relation of the oscillations of the two antenna systems.

The oscillating movement of the two antenna systems is produced by a suitable driving motor 70 (Figs. 2 and 3), the shaft 71 of which is provided with a gear wheel 72 (Fig. 5) which meshes with a gear wheel 73 attached to a short shaft 74 which is mounted in a suitable bearing 75 and passes into the pedestal 56 through a suitable opening provided for that purpose. Inside of the pedestal 56 is provided a spindle 80 which is mounted in ball bearings 81 and 82 at the top and bottom of the pedestal, respectively, to permit free rotation of the spindle. A bevel gear 83 on the inner end of the shaft 74 meshes with a bevel gear 84 on the spindle 80 to drive the spindle when the shaft 74 is rotated.

The spindle 80 extends upwardly beyond the upper end of the pedestal 56 and is provided at its upper end with a bevel gear 85. A shaft 86 extends horizontally across the upper end of the spindle 80 and is journaled at one end in a ball bearing 87 in one side of a housing 88 mounted on the plate 60, while the other end of the shaft 86 is rotatably mounted in the side of the housing 88 by means of ball bearings 90. The shaft 86 may turn within the housing 88 without rotating a bevel gear 89 which is free to turn independently in its bearing 90.

The bevel gear 89 is driven from the bevel gear 85 at the upper end of the spindle 80 through a differential mechanism including a freely rotating double ended bevel gear 95 the teeth on one end of which mesh with the bevel gear 85 and on the other end of which mesh with planetary gears 96 (Fig. 4) which are carried on a member 97 splined to the shaft 86. The planetary gears 96 also mesh with the bevel gear 89.

It will be seen that if the shaft 86 is held stationary, then by rotating the spindle 80 the bevel gear 89 is rotated by means of the bevel gear 85, the double-ended bevel gear 95, and the planetary gears 96. But if the shaft 86 is rotated in one direction or the other, the gear 89 will no longer be directly driven from the spindle 80 because of the differential mechanism 95—96—89 and will move either slower or faster than the spindle 80 depending on the direction of rotation of the shaft 86.

The bevel gear 89 is provided with a hub 100 upon which is splined a crank arm 101 to the end of which is pivoted a link 102 which extends outwardly to the reflector 20 and has its outer end pivoted to one of the reinforcing members 51. With the shaft 86 held stationary, therefore, rotation of the spindle 80, driven by the motor 70, will rotate the crank arm 101 and cause the connecting rod 102 to move the reflector 20 about the horizontal bearings 67 and 68 to produce a rocking movement in a vertical plane. It will be shown later that the shaft 86 is caused to rotate slightly when the cylindrical member 57 is rotated to change the azimuth direction of the beam produced by the elevation antenna 20—21, so as to compensate for the relative movement between the spindle 80 and the housing 88 which carries the oscillations of the elevation antenna 20—21 and the azimuth antenna 10—11.

The vertical oscillation of the antenna 20—21 is translated into horizontal oscillation of the antenna system 10—11 by a linkage system which couples the two motions together. The drive for the azimuth antenna 10—11 is taken from the bevel gear 85 by means of a shaft 105 on the end of which is a bevel gear 106 which meshes with the gear 85 (see Fig. 4). The end of the shaft 105 adjacent the gear 106 is journaled by means of ball bearings 107 in a portion 108 of the wall of the housing 88. The shaft 105 extends outwardly from the housing 88 at a small angle from the perpendicular to the shaft 86 and its other end (see Figs. 2, 3, and 6) is supported in a bearing 109 which is supported at the top of a column 110 in turn supported on an extension 111 of the plate 60.

The column 110 is made in two parts provided with flanges at the juncture thereof which are secured together by any suitable means, such as the bolts 112 through the plate extension 111. A vertical shaft 113 (Fig. 6) is rotatably mounted within the column 110 by suitable ball bearings 114 and 115 at the top and the bottom of the column. The shaft 113 extends up beyond the top of the column and is provided with a bevel gear 116 which meshes with a bevel gear 117 attached to the end of the shaft 105.

The lower end of the shaft 113 also extends beyond the bottom of the column 110 and is provided with a crank arm 118 to which is pivoted one end of a link 119 (Figs. 2, 3, and 6) which extends over to the azimuth antenna 10—11 and is pivotly attached to a plate 120 which extends outwardly from the bracket 37.

It will be seen that with this arrangement, rotation of the driving motor 70 drives the spindle 80 which in turn rotates the shaft 86, the shaft 105, and the shaft 113. Rotation of the shaft 86 causes the vertical oscillating movement of the antenna 20—21; rotation of the shaft 113 causes the horizontal oscillating movement of the azimuth antenna 10—11.

Means are now provided to shift the horizontal or azimuth direction of the beam produced by the antenna 20—21 and the center of scan of the beam produced by the azimuth antenna 10—11 without altering the rhythmical sweeps of either antenna and without changing the phase relation therebetween. For this purpose a motor 125 (Figs. 2 and 3) is provided mounted upon the floor 35 of the truck. The shaft of the motor 125 is provided with a worm 126 which meshes with a worm wheel 127 mounted in a suitable bearing 128. The worm wheel 127 has attached to it a lever arm 129 which extends a short distance beyond the periphery of the worm wheel 127 and to the end of which one end of a link 130 is pivoted. The other end of the link 130 is pivoted to a small bracket 131 which is attached to the column 110 near the bottom thereof. When the shaft of the motor 125 rotates, the worm wheel 127 is turned slowly, which causes the column 110 together with the assembled mechanism including the plate 60, the cylindrical member 57, the housing 88, the supporting arms 65 and 66, and the antenna 20—21 to rotate thus changing the azimuthal direction of the beam produced by the antenna 20—21. At the same time, by virtue of the link 119 which couples the motion of the crank arm 118 to the horizontal antenna system 10—11, this latter antenna system is also caused to move horizontally without interrupting its horizontal oscillation, so that the center of the oscillatory movement is shifted horizontally.

This oscillatory movement just described is preferably limited to a few degrees since, as will be explained, the horizontal shift in the directions of both beams is necessary only through a small angle. However, because the cylindrical member 57 and housing 88 rotate with this movement about the bearing column 56, so that the relative position of the spindle 80 and shaft 86 is altered, the compensating arrangement involving the differential 95—96—89 is used. A gear wheel 135 (Fig. 5) is rigidly attached to the top of the column 56. This gear wheel 135 meshes with a gear sector 136 which is attached to the lower end of a stub shaft 137 journaled in a suitable ball bearing 138 supported in a web 139 which extends across between the walls of the housing 88. Above web 139 stub shaft 137 is provided with a bevel gear 140 which meshes with another bevel gear 141 attached to shaft 86.

When housing 88 is rotated with respect to column 56, gear sector 136 is caused to rotate as it moves bodily around gear 135 which is stationary. This rotates stub shaft 137 and bevel gear 140 which in turn rotates bevel gear 141 and shaft 86. Rotation of shaft 86 rotates member 97 which carries planetary gears 96, and since the planetary gears are thus caused bodily to rotate, the relative movement between bevel gear 89 and gear 95 is changed. When the housing 88 is rotated bodily gear 95 will roll around the gear 85 which would normally cause a change of relative position between gears 89 and 85. The differential arrangement, just described, compensates for the movement of gear 95 causing gear 89 to rotate in the opposite direction or cancelling the movement of the gear 95. With this arrangement the gear 89 and therefore the vertical oscillating movement of the antenna system 20—21 is maintained relative to the movement of the gear 85.

Figure 4:
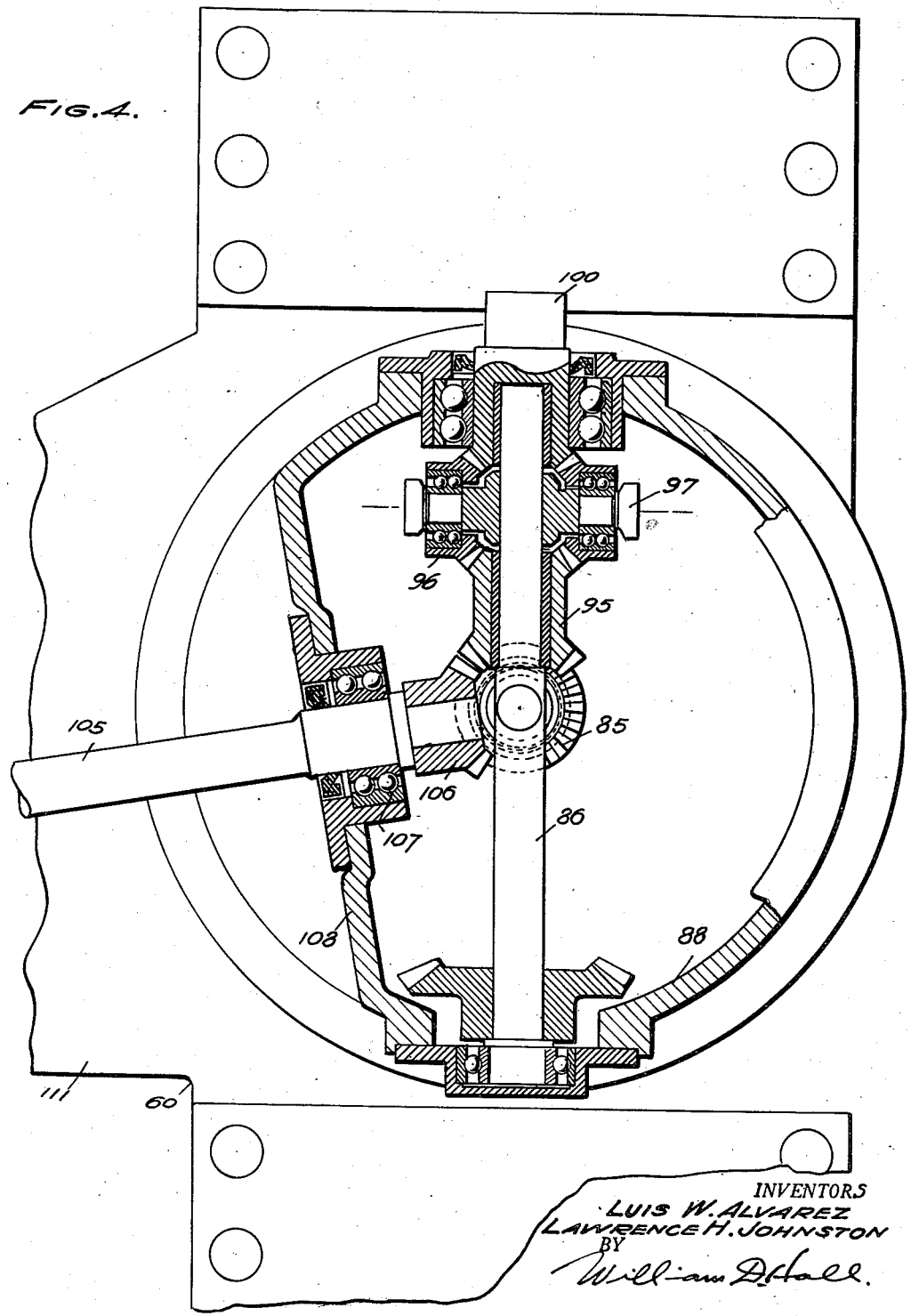
Fig. 4 is a sectional plan view through the top of the supporting pedestal for the vertically scanning antenna, this sectional view being taken on the line 4—4 of Fig. 5.

When the housing 88 rotates bodily about the pedestal 56 the gear 106 Fig. 4 also rolls around the gear 85 and there is additional relative movement between these gears. This additional rotation is in the proper direction to correct for the change in angularity of the crank arm 118 when the housing 88 and associated parts are rotated.

With the arrangement described above both antennas 10—11, 20—21 will oscillate when the motor 70 is operated, the antenna 20—21 oscillating in a vertical plane while the antenna 10—11 oscillates in a horizontal plane. In addition the horizontal direction of both antennas may be altered by means of the motor 125 without interfering with the oscillatory movements and at the same time compensating for changes in angularity of the driving mechanism.

High frequency energy may be fed to the two antenna systems from any suitable modulator and high frequency source 145 Figs. 2 and 8. From this high-frequency generator the energy may be led by means of a wave guide 146 through a high-frequency switch 147 comprising a shutter disk. The wave guide 146 divides into two sections facing the disk at diametrically opposite positions and these sections are provided with continuing sections 148 and 149 on the opposite side of the disk, the former leading to the elevation antenna 20—21 and the latter leading across the floor of the truck to the azimuth antenna 10—11. A section 150 of flexible wave guide connects the section 148 with the wave guide feed 21 and permits movement of the antenna 20—21 without affecting the energy flow through the wave guide. A flexible wave guide section 151 is used to connect the wave guide section 149 to the wave guide feed 11 of the antenna 10—11. This permits the antenna 10—11 to move without affecting the energy flow through the wave guide.

The shutter disk of the switch 147 Fig. 2 is cut in such a manner that energy is delivered to the antennas alternately and the switching time takes place when each is passing through the center of its oscillatory movement. As the apparatus is operated, therefore, a fan-shape beam of electromagnetic radiation from the elevation antenna 20—21 will sweep downwardly through an angle depending upon the oscillatory movement of the antenna system, followed immediately by a sweep from left to right of a fan-shape beam having a substantially vertical plane from the azimuth antenna 10—11. This is followed by the sweep upwardly of the beam from the elevation antenna 20—21 which in turn is followed by the sweep from right to left of the beam from the azimuth antenna 10—11, the cycle repeating itself as long as the mechanism is operated.

It is understood that the timing of antenna action and phase may be varied. Thus if each antenna is part of a complete radar system (thus providing two complete units) the phase relation between the antennas is of no consequence. It is also possible to provide electrical switching of the common parts of the radar system from one antenna to the other and do this at such a high rate that the phase difference in the antennas is not important.

The manner in which these antennas are controlled and operated to locate an airplane in space will now be described. Referring to Fig. 8, it will be understood that modulator 145 controls the pulsing of the high-frequency oscillator and therefore the pulses of electromagnetic radiation which are radiated from the antennas alternately as the switch 147 feeds first one and then the other. Thus, pulses of electromagnetic radiation are projected into space at a repetition rate determined by the oscillator, and are reflected back to the antennas from an object, such as an airplane, encountered in space. A reflected pulse will arrive at the antennas while the R. F. oscillator is inoperative between pulses, the range of the apparatus being predetermined and the spacing between pulses being selected so that reflected pulses from airplanes within the range of the apparatus will arrive before the next succeeding pulse is transmitted.

In accordance with known principles of radio-echo detection a radio-frequency switch 155, known as a T-R box, is provided which operates to prevent energy from passing into the receiver 156 to which the antennas are also connected through switch 155 when the R. F. oscillator is transmitting its pulse. An example of such a T-R box is shown and described in the application of James L. Lawson entitled Protection of Receiver Against Overload, Ser. No. 479,662, filed March 18, 1943. When oscillator 145 is operating, a spark discharge in the switch 155 acts effectively to disconnect receiver 156 and causes the output of 145 to pass through the wave guide to the switch 147 and thence to the antennas. When this discharge is not taking place oscillator 145 is effectively disconnected from the antennas with receiver 156 connected instead and the received signals can pass into receiver 156.

The output of receiver 156 is delivered directly to the control grids of two cathode ray tubes 157 and 158, the former being the elevation cathode ray tube and the latter being the azimuth cathode ray tube, as will be explained later. In both of these tubes the effect of the incoming signals is to intensify the electron beam so as to produce a spot of light on the face of the tube. The tube may have electrostatic or electromagnetic deflection, the latter being indicated in the drawings. The horizontal deflection coil 159 of tube 157 is connected to a range sweep circuit 160 which is controlled by a pulse from modulator 145. The arrangement is such that every time a pulse of electromagnetic energy is radiated from one or the other of the antennas the electron beam of the cathode ray tube 157 is started in a sweep from left to right of the tube, the time required for the beam to sweep across the tube corresponding to the portion of the time interval between transmitted exploratory pulses, as determined by the desired range. The sweep circuit 160 may be arranged to provide different sweeps corresponding to different ranges, and one of these sweeps is selected in a manner to be described later. The vertical deflecting coil 161 of the azimuth tube 168 is also connected to this same sweep circuit 160, so that the electron beam of tube 158 sweeps vertically every time a pulse of electromagnetic energy is radiated. The electron beam of the cathode ray tubes 157 and 158 move synchronously and in phase with respect to each other and in proportion to the increase in range of the system with the increase in time elapsing after the transmission of exploratory pulse.

The electron beam of the elevation oscilloscope 157 is caused to move vertically with the elevational oscillation of the elevation antenna 20—21. In order to accomplish this the vertical deflecting coil 164 of the tube 157 is connected to the output of a potentiometer 165 which is oscillated with the elevation antenna. As illustrated in Fig. 8a potentiometer 165 is mounted on a bracket 166 attached to arm 66, and it is rotated by means of a gear sector (Fig. 2) attached to the channel 52 of the antenna system 20—21 which meshes with a gear 168 attached to the rotor of the potentiometer. As the elevation antenna oscillates in the vertical plane, the electron beam of the cathode ray tube 157 moves vertically in synchronism therewith. At any instant, therefore, the vertical position of the electron beam in the cathode ray tube 157 will correspond to the vertical direction of the fan-shaped elevation beam radiated by the elevation antenna 20—21.

Similarly the horizontal movement of the electron beam of the cathode ray tube 158 is controlled by the horizontal oscillation of the azimuth antenna 10—11. In order to accomplish this, the horizontal deflecting coil 168 of the cathode ray tube 158 is connected to a potentiometer 169 the rotor of which is rotated by the oscillation of the azimuth antenna. The manner of connecting the potentiometer 169 to the oscillating movement of the azimuth antenna 10—11 is indicated in Fig. 8a. The potentiometer 169 is shown secured to the bed plate 34, as by means of the strap 172 in such a position that a gear wheel 173 attached to its shaft can mesh with a curved rack 174 so that as the entire antenna 10—11 rotates about its bearing 36 the rotor of the potentiometer will also rotate to vary the current through the horizontal deflecting coil 168 and thus maintain the electron beam in the azimuth tube 158 in a position corresponding to the azimuthal position of the oscillating azimuth antenna 10—11.

The representation of an incoming airplane might thus appear on the cathode ray tube 157 as a spot of light 176 indicating a range which is measured by the distance of that spot from the left side of the tube, and an elevation which is measured by the distance of the spot from the bottom edge. In like manner the same airplane may be represented on tube 158 by means of a spot of light 177 which would have the same range but this time measured by the distance the spot is from the bottom edge of the tube and having an azimuth which is measured by the distance the spot of light is from the left side of the tube. This gives the actual position of the incoming airplane in range, elevation, and azimuth. The manner of producing an indication of the desired position of the airplane on the predetermined glide path will now be described.

The desired position of the incoming airplane is continuously presented on the elevation and azimuth tubes 157 and 158 by means of an apparatus which we call the "director" and this apparatus is shown schematically at the bottom of Fig. 8. It includes a shaft 180 which may be called the "range shaft" suitably journaled in supports 181 and 182 and provided at the ends thereof with means for releasably attaching cams 183 and 184, the former being the elevation cam and the latter being the azimuth cam. Although we prefer to use cams cooperating respectively with cam followers 185 and 186, if desired, charts may be used in place of the cams. When charts are used, the cam followers are replaced with styluses which may be moved manually to follow lines on the charts as the charts are rotated. This will be explained later.

Shaft 180 is caused to start its rotation when the incoming plane is a predetermined distance, as, for instance, 50,000 feet, from the landing runway, and to continue rotating at a relatively slow speed. The rate of angular rotation of the cams is proportional to the speed of the incoming airplane, the arrangement being such that the airplane has reached the runway before one complete rotation of the shaft is made. As will be later described, we prefer to have two different ratios between the speed of the incoming airplane and the rotation of the shaft, one of which is effective between, say 50,000 feet and 10,000 feet and the other from 10,000 feet in. The latter provides that the rotation of the shaft is speeded up after the airplane has reached 10,000 feet from the runway, so that greater accuracy in the predetermined glide path may be obtained as the airplane approaches the runway.

Shaft 180 is driven through bevel gears from a gear and clutch mechanism 188 and a driving motor 189 to which the latter is operatively connected. The motor 189 is a variable speed motor the speed of which is controlled by a suitable motor control circuit 190 which may in turn be adjusted by a potentiometer 191 shown at the extreme bottom of Fig. 8. The rotor of the potentiometer 191 is provided with a gear 192 which meshes with a gear 193 attached to a hand wheel 194. It will be understood that by rotating the wheel 194 in one direction the potentiometer 191 will affect the motor control circuit 190 so as to increase the speed of motor 189, and therefore increase the speed of the range shaft 180; while rotating the hand wheel 194 in the other direction will cause potentiometer 191 to affect the motor control circuit 190 to cause the motor 189 to run slower, and therefore to slow down the rotational speed of shaft 180.

A range marker line is produced on the face of each of the cathode ray tubes 157 and 158, these lines being controlled at all times by the angular position of shaft 180. To this end, a range marker pulse generator 200 is provided which is triggered by a pulse from modulator 145. The marker pulse generator produces a short, positive voltage pulse which, as indicated, is applied to the control grid of each of the cathode ray tubes 157 and 158. This range marker pulse occurs at a time after the pulse is received from the modulator, and therefore after the exploratory pulse has been radiated into space. The instant of generating this pulse, i. e., the pulse generated by the range marker generator 200, is controlled by the setting of potentiometer 201.

The range marker generator has not been shown in detail, but it will be understood that a delay multivibrator might be used, the operation of the multivibrator being initiated by the pulse from the modulator, and the delay being controlled by potentiometer 201. The arrangement is such that when the airplane is at a range of 50,000 feet, shaft 180 starts to rotate, and a delayed range marker pulse will be produced by the range marker generator. The pulse will occur at such a time delay from the transmission of the exploratory pulse that a bright spot will be produced on the face of each cathode ray tube on each range sweep at a distance from the range base corresponding to 50,000 feet, and, as the shaft 180 is rotated, the time delay of this range marker pulse is decreased by the change in the resistance of potentiometer 201 so that a bright marker line is thus produced on the screen of each oscilloscope. This line moves towards the left on the screen of tube 157 to the position of zero range and towards the bottom on the screen of tube 158 which also corresponds to the zero range position.

In controlling the speed of the range shaft 180 it may be the duty of a range operator to watch either of the cathode ray tubes 157 and 158 to observe the appearance of the spot 176 and 177 which will appear on the tubes when the incoming airplane reaches approximately 50,000 feet in its approach towards the landing field. When the range operator sees the spots appear, he will start the motor 189 and turn on the range marker generator by means of a suitable control switch (not shown) whereupon the range markers 202 and 203 will appear on the cathode ray tubes 157 and 158 respectively. These range markers will continuously indicate the range of the incoming plane and also the angular position of the range shaft 180. The range operator, by manipulating the tracking wheel 194, can adjust at any time the phase of range marker pulses by adjusting the speed of the motor 189 so that the range markers 202 and 203 will be traveling at the same speed as the airplane representations 176 and 177 as they move toward the base lines at a rate proportional to the speed of the incoming plane.

It may happen that the rate of movement of the range markers and the signals are the same but that the range markers are not aligned with the signals. In order to make a quick brief acceleration or deceleration of the movement of the range markers an aided tracking wheel 204 is provided. Motion of this aided tracking wheel 204 is transmitted through the gears 205 and 206 and auxiliary shafts 207 and 208, to the gear and clutch mechanism 188 in which is provided suitable differential and clutch devices which permit the speed of the shaft 180 to be increased or decreased from that normally produced by motor 189. By means of the two wheels 194 and 204, the range operator can cause the range markers 202 and 203 to follow very accurately the movement of the echo images 176 and 177 on the faces of the tubes 157 and 158. In this manner the range of the incoming airplane will always correspond to the charted range on the cams 183 and 184 which are driven by the range shaft 180.

It is the intention, in using the apparatus for guiding an airplane to a blind landing, to give the pilot of the airplane not only the information as to his position with respect to the glide path but also his distance from the landing field, and we prefer to correlate this distance with the speed of the incoming airplane and to give the pilot the accurate time it will take him to reach the runway in so many "minutes or seconds to touch." We therefore provide a range clock 210 which is operatively connected with the mechanism controlling the speed of the shaft 180 and arranged to register in "minutes and seconds to touch." The details of construction of this range clock are not given since speed and time registering devices are known in the art.

Figure 3:
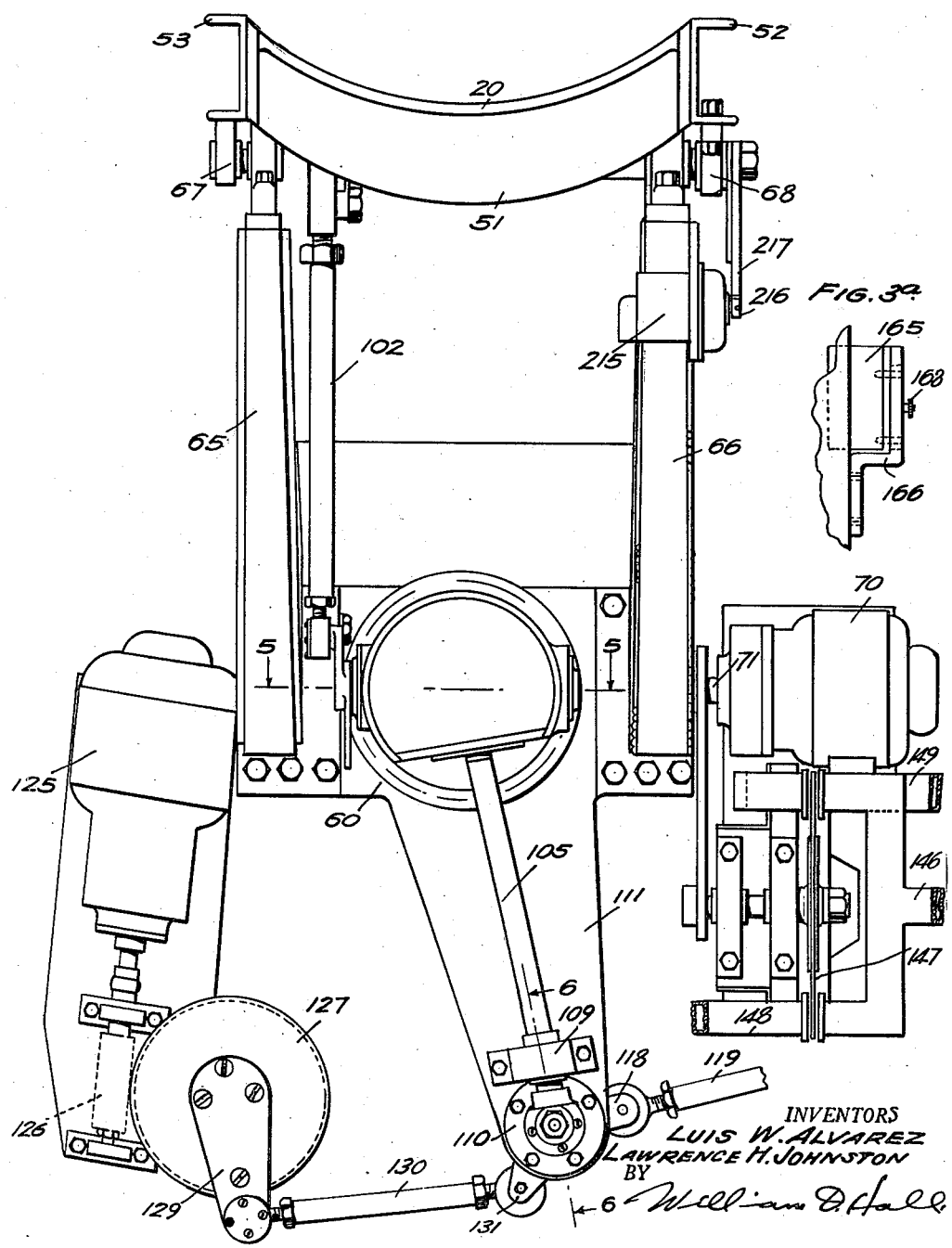
Fig. 3 is a plan view of the vertically scanning antenna system together with the supporting mechanism and the driving motors for producing the oscillation of both antennae and the horizontal directivity of both.

The manner in which the elevation and azimuth error signals are obtained for guiding the pilot of the incoming airplane will now be explained. The elevational movement of the elevation antenna system, as it oscillates in the vertical plane, is transmitted electrically to the director by means of synchronous transmitter and receiver, both of which may be of the type known as "Selsyn" motors having three-phase stators and single phase rotors. The synchronous transmitter 215 is mechanically connected to the elevation antenna 20—21. The manner of connecting this motor is shown in Figs. 2 and 3. The body of the motor is rigidly secured to the arm 66 which supports the antenna 20—21 and the shaft is provided with a pinion gear 216 which meshes with a gear sector 217 attached to the reflector 20, the arrangements being such that when the reflector 20 oscillates the gear sector 217 causes the shaft of the synchronous transmitter 215 to rotate. This shaft is connected to the rotor of the transmitter.

The rotor of the synchronous transmitter 215 is connected to an alternating voltage source 218 having a frequency, for instance, of 5000 cycles. The field windings (stator) of the synchronous transmitter 215 are connected to the field windings of a synchronous receiver 219 which is mounted in the director and shown at the bottom, left portion of Fig. 8. The rotor of the receiver 219 is electrically connected to an elevation marker pulse generator 225.

The synchronous receiver 219 is mounted between two supports 220 and 221 in such a manner that the entire stator housing may be rotated independently of the rotor thereof. The rotor of receiver 219 is mechanically connected to a cam follower 185 which can rotate the rotor with respect to the stator in the manner described below. The stator of receiver 219 is arranged to be rotated by means of a manually operated elevation error wheel 226. This wheel is attached to a shaft 227 which is rotatably mounted in a support 229. A bevel gear 230, on the lower end of the shaft 227, meshes with a bevel gear 231 mounted on a shaft 232. Shaft 232 carries a pinion gear 233 which meshes with a gear 234 carried on a shaft 235, both shafts 232 and 235 being supported between the supports 220 and 221. Gear 234 meshes with a ring gear 236 attached to the stator of receiver 219 on the opposite side of support 221. From this arrangement it will be seen that when the elevation error wheel 226 is rotated the stator of receiver 219 will be rotated through the gear train 230, 231, 233, 234 and 236.

It will be understood that the rotor of receiver 219 will deliver an alternating voltage to the elevation marker pulse generator 225 as long as its rotor does not have the angular position corresponding to the angular position of the rotor of transmitter 215, whose rotor is mechanically connected to the elevation antenna 20—21. With the rotor of receiver 219 set in some predetermined, fixed angular position, the alternating voltage delivered by the rotor of receiver 219 will rise and fall substantially sinusoidally, as the elevation antenna oscillates, and it will pass through a null point each time the rotor of transmitter 215 passes through the angular position corresponding to the angular position of the rotor of receiver 219. The elevation marker pulse generator 225 is arranged to impress a positive rectangular wave or pulse on the control grid of the cathode ray tube 157 whenever this null point is reached. This pulse is of long enough time duration so that at least one entire range-sweep on the cathode ray tube 157 will be illuminated, thus creating the elevation marker line 275.

The entire schematic diagram, including the synchronous transmitter-receiver combination and the elevation marker pulse generator, is shown in Fig. 10. A multivibrator oscillator 240 is arranged to produce an oscillation of about 5,000 cycles per second, which is amplified by a buffer amplifier 241 and delivered through a coupling condenser 242 to the rotor coil 243 of synchronous transmitter 215, this rotor being mechanically connected to the elevation antenna 20—21 which mechanically oscillates it back and forth. The field coils 244 which represent the stator of transmitter 215, are connected, as indicated, to the field or stator coils 245 of receiver 219, this receiver constituting a part of director. Rotor 246 is connected across a suitable terminating resistance 247 in the elevation marker pulse generator, one end of this resistance being connected to ground. An adjustable portion of the voltage, developed across resistance 247, is applied, by means of a coupling condenser 248 and a potentiometer 249, to the grid of an amplifier tube 250. The output of tube 250 is again amplified by means of a screen grid tube 251, and the output of this tube is coupled through a coupling condenser 252 to one end of the primary winding of a transformer 253, the other end of the primary winding being grounded. The secondary winding of the transformer 253 is connected to the anodes of a double rectifier tube 254, the cathodes of which are connected together and to one output terminal of the circuit. The midpoint of the secondary of the transformer tube 253 is connected to the other output terminal 256 for the circuit, and between the output terminals are connected a resistance 257 in parallel with a condenser 258, the values of the condenser-resistor circuit being such as to give a time constant somewhat greater than one-half cycle of the alternating cycle being rectified.

In the operation of this circuit the alternating voltage applied to the grid of tube 250 rises and falls as rotor 243 of transmitter 215 is oscillated by the elevation antenna, passing through a null point as the two rotors line up. This voltage is amplified by the tubes 250 and 251, and an alternating voltage is induced in the secondary of transformer 253, which voltage is applied to the plates of the double rectifier 254, so as to produce across the resistance 257 a series of half-wave voltage pulses all having the same polarity. Because of the filter action of the resistance-condenser combination 257—258, the envelope which varies with the rotation of the rotor 243, will appear across the terminals 255 and 256. This is applied in any suitable manner to the cathode ray tube 157 so as to utilize only the negative peaks of the envelope which occur at the null points when the rotors of the two self-synchronous motors are aligned. For instance, the terminal 255 may be connected to ground and terminal 256 to the cathode of the cathode ray tube 157 through a small condenser. Nothing but a positive pulse appearing on the intensity grid of the cathode ray tube will then affect the electron beam so as to produce an indication on the face thereof.

The position of the rotor of receiver 219 is controlled by the cam follower 185, the movements of which are under the control of the elevation cam 183 rotating with the range shaft 180. To this end, the cam follower 185 is mounted on an arm 265 which is attached to a short stub shaft 266 rotatably mounted in a support 267. Also attached to the shaft 266 is a gear wheel 268 which meshes with a gear 269 mounted on a shaft 270 which is directly coupled to the shaft 271 of the synchronous receiver 219.

As shaft 180 rotates, the cam 183 and the cam follower 185 will move about the shaft 266 in accordance with the configuration of the cam 183, and the shaft 271 of the self-synchronous receiver 219 will be turned accordingly through the gear train 268 and 269. The ratio between these two gears is such as to produce the desired amount of rotation of the shaft of the synchronous receiver 219 for the maximum alteration in the cam surface. A spring, not shown in the drawing, holds the cam follower 185 against the surface of the cam 183 at all times, so that the shaft of receiver 219 is under the control of the cam surface at all times.

As has been stated, the elevation marker pulse generator 225 produces a positive pulse which is long enough in time duration, as compared to the extremely rapid sweep of the electron beam to the right whenever a pulse of electromagnetic energy is radiated, so that the electron beam is energized for at least one trace completely across the tube forming an elevation marker 275. The position of this elevation marker on the face of the cathode ray tube will depend not only on the angular position of the rotor of the synchronous receiver 219 but also upon the angular position of its stator. The angular position is therefore set when the mechanism is started for bringing in an airplane, so that the elevational marker 275 will be approximately at the center of the face of the tube 157 when the rotor of the self-synchronous motor 219 is at a rotational angle which is determined by a cam follower position representing about half of the maximum angle at which the plane may be intercepted by energy from the oscillating electromagnetic beam when the signal first appears on the cathode ray tube. As soon as the operator sees the signal 176, he turns the elevation error wheel 226 in the proper direction to raise the elevation marker 275 until it coincides with the signal 176. This act of turning the elevation error wheel 226 is what produces the error signal which is then transmitted to the pilot of the incoming airplane.

It will be seen that the shaft 235 rotates when the elevation error wheel 226 is turned. A potentiometer 276 is provided with the rotating arm thereof attached to the shaft 235, the arrangement being such that the potentiometer produces a voltage proportional to the angle through which the error wheel 226 is turned. This would give a reading on the meter 277 which is connected to the potentiometer which would be proportional to the elevation angle between the desired position of the incoming airplane and its actual position. In some cases such an angular error might be sufficient, but we prefer to produce the error in feet-off-of-the-path.

Since the sine of small angles measured in radians is almost equal to the angle itself, and the distance in feet from the actual position of the airplane to its desired position is equal to the range in feet times the sine of the angle, a very close approximation of this distance may be obtained by multiplying the angle itself by the range in feet. Since the potentiometer 276 produces a voltage which is proportional to the angle, we multiply this voltage by another voltage proportional to the range and obtain a voltage which is approximately proportional to the distance in feet-off-of-the-glide-path.

Thus, we provide another potentiometer 278 the resistance of which is controlled by the voltage from the potentiometer 276. The movable arm of this potentiometer 278 is attached to a shaft 279 rotatably mounted in suitable supports 280 and provided with a bevel gear 281 which meshes with another bevel gear 282 attached to range shaft 180. Since the voltage across the potentiometer 278 is varied in accordance with the voltage produced by the potentiometer 276 and the rotating arm of the potentiometer 278 is moved with the range shaft 180, the voltage delivered to the meter 277 is proportional to feet-off-of-the-path, and the meter 277 may be calibrated to give the correct error position of the airplane in feet.

When the pilot of the airplane corrects his position and flies towards the desired path, the signal 176 on the tube 157 will leave the elevation marker 275, whereupon the operator will again turn the elevation error wheel 226 to cause the elevation marker 275 to follow the signal 176. As he does so, the potentiometer 276 will change the voltage delivered to the potentiometer 278 to reduce the error signal on the meter 277 to zero when the airplane reaches the desired position.

As has already been stated, the speed ratio between the range shaft 180 and the driving motor is automatically changed once during the incoming flight of the airplane, so as to produce one speed ratio while the airplane is coming from a range of 50,000 feet, for instance, to a range of 10,000 feet and to provide another speed ratio while the incoming airplane is approaching the landing runway from the range of 10,000 feet. In order to provide this change in the speed ratio in the driving mechanism for the range shaft 180, we provide a switch 285 which is adapted to be operated by a cam 286 mounted on the range shaft 180 and rotating therewith. The switch 285 is connected to suitable mechanism such as a relay and solenoid combination (not shown) in the gear and clutch mechanism 188, by means of which the gear ratio is automatically and substantially instantaneously shifted when the range shaft 180 has rotated through an angle corresponding to the range between 50,000 feet and 10,000 feet. By virtue of this shift in the speed ratio, the range shaft 180 will thereupon rotate faster, so that the cam surface moves faster under the follower and greater accuracy may be obtained by the last 10,000 feet of the approaching airplane.

At the same time that the speed of the range shaft 180 is changed the range scale of the cathode ray tubes 157 and 158 must also be changed. This is accomplished by means of another switch 287 which is arranged to be operated by a cam 288 on the range shaft 180, this switch operating simultaneously with the switch 285. The switch 287 is connected to two relay switches 291 and 292. The former is arranged to shift the connection of the range pip circuit 200 from the potentiometer 201 to another potentiometer 293 the moving arm of which is attached to a shaft 294 which carries a gear 295 meshing with a gear 296 carried on the shaft 279. Whenever the range shaft 180 rotates the shaft 279 and the shaft 294 also rotates, but until the switch 287 operates, the range pip circuit 200 is under control of the potentiometer 201. After the operation of the switch, when the range of the incoming airplane is approximately 10,000 feet, the switch 291 shifts the control of the range pip circuit to the potentiometer 293 which is so designed as to give the proper range scale on the cathode ray tubes 157 and 158.

Operation of the relay switch 292 disconnects the potentiometer 278 and connects another potentiometer 295 in its place the moving arm of which is connected to the shaft 294. By this arrangement the potentiometers 278 and 201 may make a complete rotation during that portion of the rotation of the shaft 180 which corresponds to the change in range of the incoming airplane from 50,000 to 10,000 feet, while the potentiometers 295 and 293 may be arranged to make a complete rotation during that portion of the angular rotation of the range shaft 180 which corresponds to a change from 10,000 feet to 0 range.

It will be understood that with the potentiometers arranged in the manner described above direct current will be used for the source of supply. Alternating current, however, might be used, in which case variable transformers would replace the potentiometers.

A duplicate set of parts in the apparatus are provided for determining the error position of the incoming airplane with respect to its position in azimuth, as shown in Figs. 8 and 10. A self-synchronous motor 300 has a rotor which is arranged to rotate with the oscillating movement of the azimuth antenna 10—11, the rotor being supplied with an alternating potential which may be from the same source as that which supplies the self-synchronous motor 215, associated with the elevation antenna 20—21. The field windings of the self-synchronous motor 300 are electrically connected to the field windings of a self-synchronous motor 301 and its rotor is electrically connected to the azimuth pip circuit 302 which delivers the proper pulse to the cathode ray tube 158 every time the rotors of the two self-synchronous motors 300 and 301 are aligned.

As in the case of the self-synchronous motor 219, the self-synchronous motor 301 is mounted in the director so that its field windings may be rotated as well as the rotor, the latter being controlled by the azimuth error wheel 303 through gear connections which are duplicates of those associated with the elevation error wheel. A potentiometer 304, operated similarly to the potentiometer 276 of the elevation error mechanism, is electrically connected to one of the potentiometers 278 and 295, depending on the micro-switch 287, and with an azimuth error meter 305. As in the case of the elevation error meter, the potentiometer 304 and 278 or 295 acts to multiply the voltage which is proportional to the angle between the actual position of the incoming airplane and its desired position, so that the meter 305 will read the azimuth error in feet-off-the-path either to the left or the right in the azimuth direction.

The azimuth cam follower 186 is arranged to rotate the shaft 305 which is attached to the rotor of the self-synchronous motor 301 in the same manner as the shaft 270 is rotated by the elevation cam follower 185.

The antenna system in general may be disposed at one side of the run-way. While an ideal glide path may in general be straight, prior to levelling off, as seen by the plane pilot, such a glide path will appear to have curvature with reference to the antenna system. Hence it will be necessary to shift the center of oscillation of both the vertical and horizontal antenna systems to keep the plane in the center of the radiated beams. In the case of elevation variation it may not always be necessary to change the center of oscillations when the angular change is small. However it is generally necessary to effect this change for the horizontal antenna system.

In the form of the invention disclosed we have provided a means to shift the azimuth of the elevation antenna 20—21 and the center of oscillation of the azimuth antenna 10—11 simultaneously to conform to the desired landing path. We have also provided a means to shift the elevation of the azimuth antenna. In order to provide for these movements of the antennas the motor 125 is arranged, as has already been described, to change the azimuth position of the elevation antenna 20—21 and also the azimuth position of the center of the azimuth antenna 10—11. Also the motor 45 is arranged, as has already been described, to adjust the elevation of the azimuth antenna system 10—11.

The motor 45 is controlled by a motor control circuit 308 which, in turn, is controlled by a potentiometer 309 mounted in such a manner that the body portion thereof will rotate with the body portion of the self-synchronous motor 219, shown at the lower left corner of Fig. 8, while the rotating arm on the potentiometer will rotate with the shaft 270.

The manner of mounting this potentiometer 309 is shown in Fig. 9. A sleeve 310 forming a part of the self-synchronous motor housing extends through the supports 221 and collaborates with the supports to form a bearing for the housing of the self-synchronous motor 219. The gear 236 is attached to the sleeve 310 and is driven by the gear 234 with which it meshes. The gear 236 is provided with a plurality of supporting columns 311 which extend outwardly from the flat surface of the gear 236 and upon the outer end of which is mounted the body of the potentiometer 309 as by means of the screws 312. The shaft 271 of the self-synchronous motor 219 may be connected to the shaft 270 by means of an adjusting mechanism 313 by means of which the angular position of the shaft 270 may be adjusted with respect to that of the shaft 271. This mechanism 313 comprises a worm wheel 314 which is attached to the shaft 270 and a worm 315 rotatably mounted on a small bracket 316 secured to the shaft 271. The worm 315 may be turned with a screwdriver. The shaft 271 extends out to the worm wheel 314, while the worm wheel 314 is connected to the end of the shaft 270. As shown, the resistance wire 317 of the potentiometer is wound upon an insulating sleeve 318 which slips over the potentiometer support or body portion, the arm 319 engaging the edges of the turns of the wire. It will be seen that the body portion of the potentiometer will turn with the body portion of the self-synchronous motor, while the movable arm 319 of the potentiometer will rotate with the shaft 270.

Since the shaft 270 has its angular position controlled by the elevation cam 183, a voltage is produced on the arm of the potentiometer 309 (assuming that the body part of the potentiometer is stationary) which is proportional to the angular position of the shaft 270 as controlled by the elevation cam 183. This voltage will cause the motor control circuit 308 to operate the motor 45, so as to cause the azimuth antenna 10—11 to move about its horizontal axis to change the direction of the electromagnetic beam towards the position in space where it is desired that the incoming airplane should be. But the body part of the potentiometer 309 is also rotated; such rotation being caused by the rotation of the elevation error wheel 226. This causes the voltage produced on the arm of the potentiometer 309 to be changed by an amount proportional to the angle made between the actual position of the airplane and the desired position of it, and this causes the motor control circuit 308 to operate the motor 45 so as to move the axis of the electromagnetic beam as produced by the antenna 10—11, so that it is directed at the actual elevation position of the incoming airplane. When the airplane has corrected its position in space so that it is at an elevation angle corresponding to the desired glide path and the error wheel has been readjusted, then the meter 277 will read zero and the body part of the potentiometer 309, as controlled by the elevation error wheel 226, will be in such a position that the voltage developed on the moving arm of the potentiometer 309 will cause the axis of the electromagnetic beam from the antenna 10—11 to point at the desired position of the incoming airplane which is now the actual position. Therefore, whenever the meter 277 reads zero and the spot of light 176 on the cathode ray tube 157 is aligned with the horizontal line 275, then the axis of the electromagnetic beam produced by the azimuth antenna 10—11 will be pointed at the desired elevation angle of the incoming plane.

Although in the present instance it has been found unnecessary to shift the center of oscillation of the elevation antenna 20—21 by the elevation control motor 45 which controls the elevation of the azimuth antenna 10—11, it will be understood that this motor might also be used to control the elevation antenna in elevation.

As has already been described, the azimuth direction of the elevation antenna 20—21, as well as the azimuth antenna 10—11, are controlled by the motor 125. In order to control this motor, a motor control circuit 325 is connected to the motor, and this circuit, in turn, is controlled by a potentiometer 326 (lower right portion of Fig. 8), which is mounted similarly to the potentiometer 309, the body portion being mounted to turn with the body of the self-synchronous motor 301, while the moving arm is arranged to be rotated by the shaft 305. Thus, the body of the potentiometer is under control of the azimuth error wheel 303, while the moving arm of the potentiometer is under control of the azimuth cam 184. This potentiometer operates in a manner already described in connection with the potentiometer 309 and causes the azimuth direction of both the elevation antenna 20—21 and the azimuth antenna 10—11 to follow the desired azimuth position of the incoming airplane which is the actual position when the azimuth error wheel 303 is turned so that spot of light 177 on the azimuth cathode ray tube 158 is aligned with the azimuth marker line 327 which is produced by the azimuth marker pulse generator 302 under control of the self synchronous motors 300 and 301, already described. This statement is true only when the azimuth error meter 305 registers zero.

The azimuth marker pulse generator 302 is identical to the elevation marker pulse generator 225 and is shown in Fig. 10. No detailed description of that circuit is believed necessary.

A hand wheel 330 is provided to move the elevation cam follower 185 so that the cam follower might be lifted from the cam to permit the removal of the cam so that another cam defining a different glide path may be attached to the shaft 180. This wheel 330 is mounted upon a shaft 331 which carries a bevel gear 332, which meshes with another bevel gear 333 on the shaft 270. Similarly a hand wheel 334 is provided to move the cam follower 186. This wheel is mounted on a shaft 335 which carries a bevel gear 336 meshing with a bevel gear 337 on the shaft 305.

It will be understood that the desired glide path for an incoming airplane may be different when the wind is in a different direction, the glide path depending a good deal upon the atmospheric conditions and the topography of the ground in the vicinity of the landing run-way. Therefore, it may be desirable to have a number of elevation cams and a number of azimuth cams, so that a certain pair of cams may be applied to the shaft 180 for a given wind condition. Also some types of airplanes may require slightly different glide paths from other types and different cams may be provided accordingly.

The elevation and the azimuth cam may be made in two ways: Either the cam may be made from a record produced by following an airplane making a landing in daylight, or the outline of the cam may be traced by plotting an estimated path from a study of the territory surrounding the air field.

Fig. 12 shows a record blank upon which has been traced in dotted line the elevation path for cutting the elevation cam. It will be noted that the record is divided into a number of curved segments each representing 5,000 feet in range, beginning at 50,000 feet and extending clockwise around the record to 10,000 feet, whereupon each segment represents 1,000 feet from the 10,000 feet mark around to zero. A number of concentric circles represents the degree in elevation angle, these circles beginning at zero near the center of the record and extending out to 4 degrees near the outer circumference. By going around the record blank and plotting the degree of angle elevation desired for range distances from 50,000 feet to zero, the desired elevation path may be plotted, as for instance the dotted line in Fig. 12. This record blank may be placed upon a sheet of fibre or other suitable material and the sheet cut to conform to the dotted line. The cut fibre is then the elevation cam 183 which is placed on the range shaft, as indicated in Fig. 8, the arrangement being such that the cam will be rotated by the range shaft in the direction of the arrow in Fig. 12 which will cause the follower 185 to follow the course of the dotted line of Fig. 12 as the cam rotates.

In Fig. 13 the record for the azimuth path is shown. It will be noted that this record blank is divided into segments each of which will represent 5,000 feet in range extending in a counter-clockwise direction around the record, until 10,000 feet has been reached, and then each segment will represent 1,000 feet until the zero point is reached. This record blank also has concentric circles which start near the center at zero and grow outwardly to 24 degrees. The azimuth path has been shown plotted by the dotted line in this figure. Similarly to the elevation cam, the azimuth cam may be made by applying the plotted record to a sheet of fibre and cutting the fibre around the dotted line. The cam thus cut is applied to the opposite end of the range shaft 180 and therefore will turn in a clockwise direction as indicated by the arrow of Fig. 13, thus causing the cam follower 186 to move from the 50,000 feet mark to the zero mark.

In making the cams the paths may also be produced by following the actual flight of an airplane making a landing in daylight. To accomplish this, two of the record blanks as shown in Figs. 12 and 13 are applied to the left and right ends of the range shaft 180, respectively, and the shaft set to the proper position for picking out an incoming airplane. The cam followers 185 and 186 are removed from their respective shafts and in their place are mounted marking devices, such as pens, which will bear against the record blanks as the shaft 180 is turned. The position of these markers may then be determined by the hand wheels 330 and 334. The hand wheels 226 and 303 are first turned until the meters 277 and 305 read zero, after which these error wheels are left in these positions.

As soon as the airplane is picked up on the cathode ray tubes 157 and 158 as it approaches the run-way for a landing, the spots of light corresponding to 176 and 177 on the tubes 157 and 158, respectively, will appear. The hand wheels 330 and 334 are then turned until the elevation pip line 275 on the cathode ray tube 157 and the azimuth pip line 327 on the cathode ray tube 158 are aligned, respectively, with the spots 176 and 177. In making this alignment the markers are moved to the proper positions on the recording blanks. Thereafter, as the airplane comes in to make a normal landing, the operators turn the wheels 330 and 334 to keep the pip line aligned with the spot representing the airplane on the tubes 157 and 158. When this is done the markers will trace the elevation and azimuth paths on the record blanks, whereupon the cams may be cut, as previously described.

In some instances where it is not desired to use cams at all, the record blanks marked as described in the last paragraph may be used to bring the airplane in for a blind landing. In such a case the markers would be replaced by styluses which would be caused to follow the previously made marks on the record blanks by adjusting the hand wheels 330 and 334. The rest of the apparatus will then work as previously described.

The apparatus described in connection with Fig. 8 includes apparatus sufficient to determine the whereabouts of the airplane only when it is approaching the air field in the direction of the desired glide path. It is desirable to be able to locate all airplanes in the vicinity of the landing field, so that any one may be selected and directed to the proper position for coming in at the desired glide path. This may be done by the P. P. I. system indicated in Figs. 1 and 14. The P. P. I. or plan position indicator system is a system in which an electromagnetic beam is used to scan the horizon, if desired, in a continuous manner, and the indication is produced on a cathode ray tube by means of a radial sweep of the electron beam produced each time a pulse of electromagnetic energy is radiated, the radial sweep being rotated about the center of the tube in synchronism with the movement of the electromagnetic beam around the horizon.

In the present instance we use such an apparatus which has an antenna 340 (Fig. 14) provided with a suitable reflector 341 arranged in such a position that the electromagnetic energy is directed vertically in a beam. An auxiliary reflector 342 is mounted above the reflectors 341 and is inclined at an angle of approximately 45 degrees, whereupon the energy vertically reflected out of the reflector 341 is turned at substantially right angles so that it is directed outwardly from the reflector 342. The reflector 342 is then caused to rotate bodily around the vertical axis passing through the center of reflector 341 so as to cause the electromagnetic beam continuously to rotate about the horizon. The reflector 342 is rotated by any suitable means (not shown) and this motion is synchronized with the deflecting apparatus for the cathode ray tube 343 so as to cause the radial movement of the electronbeam of that cathode ray tube to rotate in synchronism with the reflector 342.

The apparatus for the P. P. I. system is indicated by means of the block 344, and it will be understood that this apparatus will include a high-frequency oscillator, a modulator which produces electromagnetic pulses, a receiving apparatus to receive the reflected signal and deflection circuits for controlling the electron beam of the cathode ray tube 343. Such a system in itself has been disclosed in the prior art and pertains to this invention only as it is combined with the entire system.

The cathode ray tube 343 is shown to have several spots 345 which would represent airplanes flying at some distance from the air field at which it is desired to land these airplanes. Any one of these airplanes may then be maneuvered by telephone communication with the pilot to the position, as, for instance, occupied by the spot 346, so as to approach the landing run-way in the proper direction.

In the preferred manner of operating the invention the trucks 3 and 4 are positioned at one side of the run-way, as shown in Fig. 1. The truck 3 containing the antennas 20—21 and 10—11 is arranged so that the electromagnetic beams radiated by these antennas will scan the field through which the airplane will fly in approaching the landing run-way on the desired glide path.

The antenna 340—341—342 of the P. P. I. system, which may be operated on a different frequency than the electromagnetic radiation of the antennas 10—11 and 20—21, is then started in operation and all airplanes in the vicinity of the air field will appear on the cathode ray tube 343 which is arranged in front of a "traffic manager." The "traffic manager" will then get into telephone contact with the pilot of one of these airplanes and will ask him to fly in some particular manner, as by making several sharp turns, so that he can identify him on the cathode ray tube. Having selected the proper spot of light on the cathode ray tube representing this particular airplane, the "traffic manager" can then tell the pilot in which direction to fly to get him into the proper position, as indicated by the spot 346, in order to make the desired landing. When the particular airplane has reached this particular position, it is then turned over to the "controller" who takes the airplane from the "traffic manager" and guides the airplane in to the runway by telling the pilot when is off of the desired glide path. To do this the apparatus of Fig. 8 is used.

Cams for the elevation and azimuth paths are already positioned on the range shaft 180 and the range shaft is set at the 50,000 feet range position. Presently, as the airplane approaches the field, it will be picked up by the beams from the elevation and azimuth antennas and two spots of light 176 and 177 will appear respectively on the screens of the elevation and azimuth oscilloscopes. While these spots move towards the left and downwardly, respectively, sufficiently to reach the 50,000 feet range position for the particular tubes in question, motor 189 is started for operating the range shaft 180. The tracking operator will then set wheel 194, which controls the speed of motor 189 through the potentiometer 191 and motor control circuit 190, at such a position that the range markers 202 and 203 are moving at the same speed as the spots 176 and 177 on their respective tubes. He will then turn aided tracking wheel 204 until the angular position of the range shaft 180 has been adjusted so that the range marker images 202, 203 coincide with the echo images 176, 177 representing the incoming plane. This insures that the range shaft 180 is turning at a speed proportional with the speed of the incoming airplane. The tracking operator will then keep the adjustments of these wheels 194 and 204 so that the speed of the range shaft will follow accurately the speed of the incoming airplane. By this time the controller, by looking at clock 210, can tell the pilot that he has so many minutes and seconds to touch the run-way, because this clock 210 will give a reading of the time it will take the pilot to land if he continues in at the same speed.

The elevation error operator will then turn the elevation error wheel 226 until the elevation marker line 275 is moved to coincide with the spot 176. When this is done, as has already been explained, the error meter 277 will register the elevation error in feet above or below the center of the desired glide path. The controller will then tell the pilot of the airplane that he is so many feet too high or so many feet too low, whereupon the pilot will guide his airplane accordingly and the elevation error operator will readjust the wheel 226 to cause the elevation marker 275 to follow the upward or downward movement of the spot 176, causing the elevation error meter to read zero again when the airplane is upon the desired glide path.

At the same time the azimuth error operator turns the azimuth error wheel 303 to make the azimuth marker coincide with the plane's image 177 on the screen of the azimuth oscilloscope 158. This, as has already been explained, will cause a reading on meter 305 in feet off the desired glide path to the right or to the left, whereupon the controller tells the pilot of the airplane over the communication phone in which direction to fly to get back on the center of the glide path. As the pilot maneuvers his airplane in the direction told him by the controller, the azimuth error operator again turns the error wheel 303 to follow the azimuth path of the airplane on the azimuth oscilloscope until the airplane reaches the center of the glide path whereupon the reading on meter 305 will be zero.

This procedure is repeated, the controller advising the pilot whether to fly up or down or to the right or left, and from time to time giving him the time remaining before he will reach the run-way. When the airplane reaches the 10,000 foot range position, the switches 285 and 287 are operated by the cams 286 and 288. Switch 285 operates a suitable clutch mechanism in the gear mechanism 188, which suddenly shifts the gears so as to rotate the range shaft 180 at a faster rate with the speed of motor 189 remaining constant. At the same time switch 287 operates the relay switches 291 and 292. The former changes the connection of the range marker pulse generator 200 from potentiometer 201 to potentiometer 293. This shifts the range marker 202 on the cathode ray tube 157 out again towards the right and shifts range marker 203 on the cathode ray tube 158 towards the top of the tube. At the same time the sweep circuit 160 is also altered by switch 291 to change the speed of the range sweeps on both the tubes 157 and 158. The relay switch 292 operates to shift the potentiometer 278 from the circuit of the meters 277 and 395 to the potentiometer 295, so that a different range voltage is now used to multiply with the voltages of the potentiometers 276 and 304 to obtain the error readings on the meters 277 and 305.

Again, the range shaft 180 continues to rotate, now at a faster speed, and the error readings for the elevation and azimuth on the incoming airplane are produced which readings are transferred to the pilot by the controller over the communication system. This continues until the airplane touches the run-way after which the pilot needs no further instruction from the controller.

When the first airplane has been landed in the manner described above, the dispatcher, watching the P. P. I. cathode ray tube 343, will get into communication with another one of the airplanes 345 and will advise the pilot in which direction to go to approach the landing field, after which the controller will pick up this airplane in the manner already described, and this practice is repeated over and over depending upon the number of airplanes waiting to be brought in.

In addition to the instruction given the pilot of the incoming airplane by the controller, it may be desirable to transmit a coded, variable frequency, audible signal to the pilot of the incoming airplane, this signal communicating to him in terms of coded audio signal (letters "A" and "N" transmitted over a Morse code) whenever he is above, below, right, or left of the ideal glide path. Moreover, by varying the audio frequency of these signals, the pilot is given an opportunity to judge himself to what extent he is off the ideal path. The signals cease altogether when the pilot follows the ideal path. This code channel can be operated either manually by one of the GCA system operators, or it may be operated automatically directly by the GCA system, as it will be explained below.

To this end the circuit of Fig. 11 is provided the output of which is connected to the modulating circuit of a communicating transmitter 348. The circuit includes four triodes 350, 351, 352, and 353 whose grids are connected to an adjustable arm of a potentiometer 354. This potentiometer is connected across a source of direct potential and its midpoint is grounded. When the potentiometer arm is at the midpoint of the potentiometer resistance, the grids are at ground potential. If the arm of the potentiometer is moved towards the positive end of the winding the grids become more positive in potential and if the arm is moved towards the negative end of the winding the grids become more negative in potential. The cathodes of these tubes are biased differently by means of the network 355, as will be explained.

The plates of tubes 350 to 353 are given a suitable positive operating potential from a source indicated at 356, and these plates are connected respectively to one electrode of gas discharge devices 358, 359, 360 and 361. These devices may be ordinary neon lamps. The other electrodes of the devices 358, 359, 360, and 361 are connected respectively to the control grids of tubes 362, 363, 364, and 365, suitable biases for these grids being provided through grid resistors to a negative source of potential, indicated at 366. Relays 367, 368, 369, and 370 are connected respectively in the plate circuits of the tubes 362, 363, 364, and 365.

By means of the arrangement of the bias network 355 the tubes 350 and 351 are normally conducting, while the tubes 352 and 353 are normally non-conducting, that is when the potentiometer arm of the potentiometer 354 is at ground potential. The biases are so arranged that when the arm of the potentiometer moves towards the negative end of the potentiometer the tubes 350 and 351 will be shut off in sequence, and when the arm of the potentiometer is moved towards the positive end of the potentiometer winding the tubes 352 and 353 will be turned on in sequence. Thus, if the tubes 350 and 351 are conducting normally, then the potential difference across the gas tubes 358 and 359 is insufficient to cause a discharge across these tubes, and the grids of the tubes 362 and 363 are maintained at the negative bias potential 366. Thus, the tubes 362 and 363 are not conducting and the relays 367 and 368 are open, as shown. If the tube 350 is shut off when the arm of the potentiometer 354 moves in the negative direction, the potential difference across the gas tube 358 will increase, causing a discharge to occur and raising the potential on the grid of the tube 362 to operate the relay 367. Upon further movement of the arm of the potentiometer 354 in the negative direction, the tube 351 will be shut off, thus raising the potential difference across the gas tube 359 and causing it to discharge, which increases the potential on the grid 363, causing this tube to conduct and causing the relay 368 to operate.

In a similar manner when the tubes 352 and 353 are inoperative, the gas tubes 360 and 361 will be discharging, therefore producing positive potentials on the grids of the tubes 364 and 365 and holding the relays 369 and 370 in the operative position. If the arm of the potentiometer 354 is moved towards the positive direction, first the tube 352 will become conductive which will break the discharge through the gas tube 360 and lower the potential on the grid of the tube 364 to release the relay 369. Further movement of the arm of the potentiometer 354 in the positive direction will operate the tube 353, causing the gas tube 361 to become inoperative, thus lowering the potential on the grid of the tube 365 and releasing the relay 370.

An audio oscillator tube 375 is provided with an inductance and condenser network 376, the components being so selected that the tube 375 will oscillate at a predetermined audio frequency. The tube 375 is arranged to oscillate at two different audio frequencies by changing the network 376. To this end the end of the network connected to the control grid of the tube 375 is connected through a condenser 377, the contacts of the closed relay 370, the contacts of the open relay 368 to ground. When the relay 370 is closed and the relay 368 is open, the ground is thus connected to the network 376, so that the tube 375 will oscillate at a predetermined low frequency. When this ground is removed, the frequency will be higher, and it is so removed, whenever the relay 368 closes or the relay 370 opens.

The plate circuit of the tube 375 is connected to the primary of a transformer 378 the secondary of which is connected in any suitable manner to the input circuit of the modulator for the communication transmitter 348. At any time that the tube 375 is oscillating at either the lower or higher frequencies, the communication transmitter 348 puts out the particular tone which the pilot of the incoming airplane will hear above the voice of the controller who is giving him the directions as to which way to fly.

It is desired to produce this audible note intermittently, as, for instance, in code, the code being different for movement of the arm of the potentiometer 344 on the positive side than it is on the negative side. To this end a motor 380 is provided with a suitable coding cam 381 which controls switch contacts 382 and 383. The letters A and N of the Morse code have been chosen for the signals, and the arrangement is such that the action of the motor 380 will cause the switch contact 382 to produce a series of dots and dashes representing the letter A repeated again and again while the contact 383 will operate to make a series of dashes and dots representing repetitions of the letter N.

With the relays 367, 368, 369, and 370 in the position shown, operation of these contacts 382 and 383 will have no effect on the oscillator tube 375, since the relay 367 is open, thus breaking that contact and the relay 369 is closed, also breaking that contact. Assuming that the relay 367 is closed by moving the arm of the potentiometer 354 in the negative direction, this connects the switch contact 382 with the plate of the oscillating tube 375 through the transformer primary 378. A positive potential from a source, indicated at 384 is connected to the A and N coding switch 382—383, and therefore this potential is applied to the plate of the oscillator tube 375 at the dot and dash intervals of the A code. This will cause the oscillator tube 375 to oscillate intermittently with a dot and dash at the lower audible frequency which will be heard by the pilot of the incoming airplane.

If the arm of the potentiometer 354 continues to move in the negative direction, the tube 351 will be cut off, thus closing the relay 368. This removes the ground from the network 376 and causes the oscillator tube 375 to oscillate at a higher frequency, so that the dot and dash of the A, received by the pilot of the incoming airplane, will rise in pitch.

The arm of the potentiometer 354 may be operated automatically from the azimuth error reading by means of a connection to the potentiometers 304 and 278—295, Fig. 8, or the arm may be moved by the controller who is giving the directions to the pilot of the incoming airplane. The arm of the potentiometer 354 will thus be moved toward the negative end of the potentiometer when the pilot is off of the desired glide path to the left. If the pitch of the A which the pilot hears is high, he will know he is considerably off of the path, and if it is low, he will know he is a short distance off of the path.

If the airplane is off of the desired path to the right, the arm of the potentiometer 354 is moved toward the positive end of the potentiometer winding, with the result that the tubes 350 and 351 resume their normal conductivity. This opens the relays 367 and 368 which disconnects the intermittent A voltage from the plate of the tube 375 and connects the ground to the timing network 376 of the tube 375. Tube 362 however, is cut off as the grid becomes more negative, which causes the relay 369 to release. With this relay released, connection is made between the other contact of the N switch 333 which thus supplies positive potential to the plate of the tube 375 at the sequence of the dash and dot representing the letter N.

Thus tube 375 will oscillate at the lower audio frequency intermittently with a dash and dot sequence, so that the pilot of the incoming airplane will hear the letter N at the lower audio frequency. If he continues to move farther to the right, the arm of the potentiometer 354 will become more positive, thus operating the tube 353 which releases the relay 370. The release of this relay 370 cuts off the ground to the timing network 376 of the tube 375, thus raising the pitch of the oscillation, so that the pilot of the incoming airplane will now hear the letter N at a higher pitch and will know he is farther off the course.

It will be apparent from the description of this circuit that the operator of the incoming airplane will receive the coded letter A when he is off to the left of the desired path and the coded letter N when he is off to the right, and that the pitch of the sound he hears will tell him how far he is off at either side.

It may be desirable in some instances to provide a beacon signal so that airplanes seeking the air field may be able to hear the signal and travel in proper direction to be picked up by the dispatcher. For this purpose another oscillating tube 388 is provided which may have still another audio frequency, different from the frequencies of the oscillator tube 375, and this tube may be supplied with voltage through a switch 389 and an automatically operating switch 390 which is operated by another cam similar to the cam 381 of the motor 380. When the switch 389 is closed, the oscillator 388 will operate intermittently, as determined by the switch 390, and the audio tone produced by the tube 388 will be transmitted over the communication transmitter 348. The operator thus can control the beacon transmission by means of the switch 389.

Excellent results have been obtained by "talking" the pilot of the incoming plane down to a landing in the manner described above. However, the invention is intended to cover a completely automatic arrangement in which control is relinquished by the pilot of the airplane at a given signal and taken over by the ground station, whereafter the airplane is brought in entirely automatically, without the pilot touching any of the controls.

A block diagram of apparatus to accomplish this feature is indicated in Fig. 15. Various means may be used to transmit the error voltages in azimuth and elevation to the airplane for automatically controlling the airplane to keep it on the desired glide path. In Fig. 15 the radio transmitter 392 is arranged to be frequency modulated by the frequency modulator 393 and simultaneously to be amplitude modulated by the amplitude modulator 394. Two ganged switches 395 and 396 are arranged to control the frequency modulator 393 and the amplitude modulator 394, respectively. The switch 395 is arranged to connect the azimuth error voltage and the elevation error voltage alternately to the frequency modulator 393. Similarly, the switch 396 is arranged alternately to connect two different alternating voltages, as, for instances, 400 cycles and 5000 cycles to the amplitude modulator.

When the azimuth error voltage is acting to control the frequency modulator, then the 400 cycle voltage is applied to the amplitude modulator, and when the elevation error voltage is applied to the amplitude modulator, then the 5000 cycle voltage is applied to the amplitude modulator. The switches 395 and 396 are operated by a motor 397 at a speed which will alternate the azimuth and elevation error voltage about once every second.

In the airplane there is provided a receiver 398 having a broad band detector, so that it will receive and detect the energy from the transmitter 392 throughout the audio range of the frequency modulation. A discriminator 399 receives the output of the detector and acts to vary the output of the discriminator in accordance with the frequency variation of the received signal. The output of the discriminator 399 is divided into two parts. One is delivered to the 400 cycle selector 400 and the other to the 5000 cycle selector 401. The 400 cycle selector blocks all energy except that of 400 cycle frequency, and its output is connected to an aerodynamic servo mechanism 402 which is mechanically connected to the rudder of the airplane. Similarly, the 5000 cycle selector 401 blocks all energy except that at 5000 cycles per second, and it delivers this energy to an aerodynamic servo mechanism 403 which is connected to the airplane elevators.

In the operation of the apparatus, assume that the switch 395 is in the position shown, connecting the azimuth error voltage to the frequency modulator, and the switch 396 is also in the position shown, connecting the 400 cycle voltage to the amplitude modulator 394. Thus connected, the transmitter 392 will produce radio frequency which is adjusted in frequency to correspond to the azimuth error voltage which is developed when the azimuth error wheel 303 of the director is turned to cause the azimuth marker to move out to the spot of light representing the incoming airplane on the azimuth cathode ray tube 157. Energy radiated from the antenna connected to the transmitter 392 is picked up by the receiver 398 in the airplane and the discriminator 399 adjusts the amplitude of its output to correspond with the frequency of the received signal. At the same time the switch 396 at the transmitter is in the position shown, and the transmitter is being amplitude modulated at 400 cycles. The selector 400 in the receiver receives the signal from the discriminator 399 and passes only the 400 cycle modulation, so that the horizontal aero-dynamic servo mechanism 402 is affected and only to the extent of the amplitude of the discriminator output. The servo mechanism controlling the airplane rudder will therefore move the rudder an amount proportional to the azimuth error signal and in the proper direction, so that the airplane will turn back towards the desired glide path to reduce the error signal to zero.

At the end of a second the switch 395 has turned so that the elevation error voltage is delivered to the frequency modulator, and the switch 396 has turned so that the 5000 cycle note is delivered to the amplitude modulator. Thereupon the transmitter 392 radiates a signal whose frequency is determined by the elevation error voltage and which is modulated at 5000 cycles. At the receiver 398 in the airplane the signal is picked up and the discriminator and 5000 cycle selector delivers the signal to the elevational aero dynamic servo mechanism 403 which will then respond to the extent of the elevational error signal, thus causing the airplane elevators to move in the proper direction to cause the airplane to approach the desired glide path, so as to reduce the error voltage to zero.

By means of the arrangement of Fig. 15 it is possible for the pilot of the airplane to receive a suitable signal from the ground station when he is at say 50,000 feet from the station and then to turn a switch which will connect the receiving apparatus shown in Fig. 15, so as to put the control of the airplane entirely in the hands of the controller at the ground station, who, by keeping the elevation and azimuth markers on the signal spots of the tubes 157 and 158 will feed the azimuth error voltage and elevation error voltage alternately to the airplane to control the airplane's rudders and elevators in the manner explained above.

It will be understood that other means of controlling the airplane automatically may be used in connection with the invention, the essential feature being that the error voltages for azimuth and elevation are delivered to the airplane by radio from the control station.

It will be seen from all of the above description that we have provided a ground-controlled approach system for landing an airplane or guiding it in flight by means of which the position of the airplane in space is accurately determined at some remote station, as for instance a ground station, and the controller at the ground station thereupon transmits the error signals to the airplane either by advising the pilot over the communication system to fly up or down or right or left, or the error signal may be transmitted merely as voltages which act upon automatic control apparatus to control the airplane automatically. The invention is subject to considerable variation and we do not therefore wish to be limited to what has been shown and described except by the limitations contained in the appended claims.

What is claimed is:

1. The method of guiding, from a relatively fixed station, a plane to a landing area which includes the steps of transmitting, from said station, exploratory pulses in the direction of said plane, receiving echoes of said pulses, deriving from said received echoes the instantaneous position of said plane with respect to said area, comparing said actual landing path with a desired landing path, determining the instantaneous departure between the actual and desired landing paths, and communicating said departure to said plane, whereby the plane position may be altered to minimize said departure.

2. The method of guiding a plane to a landing area by means of a land radio station which includes the steps of transmitting from said station exploratory pulses in the direction of said plane, receiving at said station echoes of said pulses from said plane, deriving from said received echoes a first set of visual images defining the actual landing path followed by said plane with respect to said area, generating at said station auxiliary images representing an ideal landing path for said plane, determining the instantaneous departures between said two paths by comparing the first images with second images and communicating said departures to said plane for reducing said departures.

3. The method of guiding a plane in flight to a landing area from a relatively fixed station equipped with a cathode ray tube having a screen, said method including the steps of: presenting data on said screen corresponding to an instantaneous position of said plane, and its actual glide path, with respect to said landing area, simultaneously presenting data on said screen corresponding to an ideal glide path, comparing the two glide paths, and communicating the results of said comparison to said plane for effecting the coincidence of the two paths.

4. The method of guiding, from a landing field, a flying airplane to a landing on said field which includes the steps of: locating from said landing field the position of said airplane with respect to said landing field, comparing said position with a predetermined desired landing path and thereby producing signals representing the instantaneous deviation of said position from said predetermined landing path and transmitting said signals to said airplane guiding said airplane to said path.

5. A system for guiding, from a landing field, an airplane to a landing on said field, said system comprising a radio pulse-echo search system for giving azimuth, range and elevation data of the actual path of said airplane during the landing operation, electrical circuits for comparing said data with the corresponding data for an ideal landing path, and means for communicating the results of said comparing to said airplane for effecting its landing substantially along said ideal path.

6. The system as defined in claim 5 wherein said last means includes an audio frequency generator, and circuits to vary the amplitude of the output of said generator in proportion to the difference between said actual and ideal paths.

7. A system for guiding, from a landing field, a flying plane to a landing on said field, said system comprising a radio pulse-echo search system including cathode ray tubes having screens and circuits for indicating on the respective screen of said tubes actual landing path followed by said plane in terms of azimuth, range and elevation of said plane, time controlled circuits also connected to said tubes for obtaining indication on said screens corresponding to an ideal landing path, circuits for obtaining the difference between the two paths, and means for communicating said difference to said plane for keeping said plane substantially on said ideal path.

8. A blind landing system for planes comprising a land station having means for indicating substantially continuously, while a plane is within the range thereof, an instantaneous, actual, spatial position of said plane, a second means at said land station for indicating substantially continuously an ideal landing path defined by the prescribed region in space where said plane should be for a normal landing operation within a predetermined landing time cycle, means for putting said second means into operation at the beginning of a landing operation, means at said land station for indicating quantitatively the departure, at any instant of the landing operation, between said actual, spatial position and said ideal path, and means at said land station for communicating said departure to said plane for guiding said plane to a prescribed landing substantially along said ideal path.

9. The system as defined in claim 8 in which said fixed station also includes additional means for synchronizing said time cycle with the speed of said plane.

10. The method of guiding an airplane to a landing on a field, from a position upon said field, which comprises the steps of: landing a first airplane in a satisfactory manner, continuously ascertaining the position of said first airplane in space as it makes said landing by scanning a predetermined area of sky in two directions with a substantially concentrated beam of high frequency electro-magnetic radiation and receiving the echo of said radiation back from said airplane and thereby determining the distance of said airplane from said field and its direction therefrom, continuously recording such distance and direction with respect to time as said landing is being made, and thereafter synchronously reproducing the recording and guiding a second airplane to a blind landing by similarly continuously ascertaining the position of said second airplane in space, continuously comparing the actual position of said second airplane with reproduced signals representing the corresponding recorded position of said first airplane, continuously communicating to said second airplane information as to the displacement between said two positions, and continuously guiding said second airplane so that its path through space will substantially follow said recorded path.

11. A system, operated from a landing field, for guiding an airplane to a blind landing on said field, comprising in combination means located at said landing field to continuously locate the position of a first airplane as it approaches and lands at said field, means to continuously record the distance and direction of said first airplane from said field, as said airplane is making a satisfactory landing so as to provide a complete record of its path through space, means to reproduce said record as a sequence of signals means including a part of said first-mentioned means to continuously compare the path of a second airplane, when making a blind landing, with said sequence of signals, and means to transmit information to said second airplane which will enable the pilot thereof to guide said airplane substantially along said recorded path.

12. A system for guiding an airplane, from a landing field, to a landing on said field which comprises in combination, means at the landing field to scan a predetermined area of the sky with a relatively concentrated beam of high frequency radiation, means to receive back any of such radiation reflected from an object within said area, whereby the direction from the landing field of a first airplane in the vicinity of the landing field may be determined, means to measure the lapse of time between the transmission of said radiation and the reception of the reflected radiation, whereby the distance of said first airplane from said landing field may be determined, means to continuously record on a blank record the direction of said first airplane from said landing field as it makes a satisfactory landing, means to continuously record on said blank record the distance of said first airplane from said landing field, as it makes such satisfactory landing, means utilizing said first-, second-, and third-mentioned means to locate a second airplane in space when it is desired to have said airplane make a blind landing, means to initiate the operation of the previously made record as said approaching second airplane reaches the distance from said landing field which is the same as the distance at the beginning of said record, means to adjust the speed of said record continuously so that the distance of said incoming airplane from said landing field will always be equal to the distance being reproduced by said record, means to continuously compare the direction of said incoming second airplane from said landing field with the direction being reproduced by said record, and means to transmit to said incoming second airplane information sufficient to enable the pilot thereof to guide said airplane so as to substantially follow said previously recorded landing path of said first airplane.

13. An apparatus for guiding a flying plane, to a landing on a field, an apparatus including a radio pulse-echo system for indicating azimuth, range and elevation of said plane, said system including two adjacent antennas, means connected with one antenna for scanning space up and down, said up and down scanning producing a substantially fan-shaped pattern lying in a generally vertical plane, said one antenna supplying elevation and range data, and means connected with the other antenna for scanning space from side to side, said side to side scanning producing a substantially fan-shaped pattern lying in a plane generally perpendicular to the first pattern, said second antenna supplying azimuth and range data.

14. A system including a pulse modulated radio transmitter, two antenna systems adjacent each other and connected to said transmitter, receiving means coupled to said antenna systems for indicating echoes, means connected with one antenna system for scanning only a sector of space back and forth in a substantially fan-shaped pattern, and means connected with the other antenna system for scanning only a sector of space back and forth at the same rate in a substantially fan-shaped pattern, said two scanning patterns extending outwardly from the antenna systems substantially perpendicular to each other with the longitudinal axes of said patterns substantially coinciding with each other, each of said fan-shaped patterns being narrow in the direction in which it scans and elongated in the direction perpendicular to said first mentioned direction.

15. A method of guiding, from a point, a moving object which includes the steps of transmitting exploratory radio pulses from said point, receiving radio echoes of said pulses from said object, obtaining a first set of space coordinates of said object with respect to said point from said echoes, generating corrective voltages whose amplitudes are substantially proportional to the differences between said first set of coordinates and a preselected set of second coordinates, and controlling the movement of said object by said voltages.

16. The method as defined in claim 15 which also includes the additional steps of maintaining continuous synchronism between the rate of change of said first and second set of coordinates and co-phasing all of said coordinates for obtaining said voltages.

17. The method of guiding a flying plane to a landing which includes the steps of transmitting exploratory radio pulses from said landing, receiving echoes of said pulses from said plane, obtaining from said echoes a first set of space coordinates of said plane with respect to said station, producing at said landing a second set of coordinates corresponding to a substantially ideal landing path, comparing the two sets of coordinates, and communicating the results of said comparison to said plane.

18. The method as defined in claim 15 which includes the additional steps of synchronizing the rate of change of said first and second sets of coordinates for making the rate of change of the second set equal to the rate of change of the first set due to said flying.

19. The method as defined in claim 15 which also includes the additional steps of generating a first and second set of visual images corresponding respectively to said first and second set of coordinates, changing the values of said second set of coordinates until the second set of images coincides with said first set of images for obtaining the quantitative and qualitative difference between said coordinates, said difference representing said results of comparison.

20. In a ground-controlled airplane approach system, the method of representing the images of an incoming plane on elevation-range and azimuth-range oscilloscopes which includes the steps of generating a first saw-tooth wave for said oscilloscopes, the duration of which corresponds to the operating range of said system while said plane is flying through a remote portion of said range, generating a second, faster saw-tooth wave having substantially the same amplitude as the first wave but having a shorter period while said plane is flying through a second predetermined portion of said range, said second portion being nearer to said system than said remote portion, and generating elevation, azimuth and range marker pulses representing the elevation, azimuth, and range coordinates, respectively, of successive points of a substantially ideal approach path in proper synchronism and phase relationship first with the generation of said first saw-tooth wave, and then with the generation of said second saw-tooth wave.

21. In a ground-controlled approach system the method as defined in claim 20 which also includes the additional steps of intensity-modulating the electron beams in said oscilloscopes by an echo signal from said plane for creating an image of said plane on said oscilloscopes, intensity-modulating said beams with the range marker pulses, and adjusting the phase of said range marker pulses until the image of said marker pulses coincides with the image of said plane.

22. A ground-controlled approach system including a transmitter, a switch, an elevation antenna and an azimuth antenna including means for scanning in elevation and azimuth, respectively, said antennas being connected to the transmitter through the switch, said switch alternately connecting said transmitter to said antennas, said transmitter periodically and alternately impressing exploratory pulses on said antennas, a receiver connected to said antennas, said receiver receiving echoes of said exploratory pulses from an object in the path of said exploratory pulses, an elevation-range oscilloscope and an azimuth-range oscilloscope, said oscilloscopes having image-producing screens and control grids for modulating the cathode ray beams of said oscilloscopes, said grids being connected to said receiver whereby said echoes produce images of said echoes on said screens, a sweep circuit controlled by said transmitter and connected on its output side to said oscilloscopes, said sweep circuit deflecting said beams from predetermined zero range positions to predetermined maximum range positions on said screens, elevation and azimuth potentiometers mechanically controlled by the angular positions of said elevation and azimuth antennas respectively, said potentiometers being respectively connected to the beam-deflecting means of said elevation and azimuth oscilloscopes for controlling the elevation and azimuth positions of the respective cathode ray beams, and means for generating elevation, azimuth and range marker pulses, respectively, for representing a substantially ideal approach path on the screens of said oscilloscopes, said elevation marker means being connected to the intensity grid of said elevation-range oscilloscope, said azimuth marker means being connected to the intensity grid of said azimuth-range oscilloscope, and said range marker means being connected to the intensity grids of both oscilloscopes, whereby said means produce images of said ideal approach path on said screens for comparing the ideal path images with the images of said echoes.

23. A ground-controlled approach system as defined in claim 22 which also includes means for equalizing the speed of approach of said system by said object with the indications of said speed by said range marker pulses on the screen of said oscilloscopes.

24. A ground-controlled approach system as defined in claim 22 which also includes an additional means for co-phasing said range marker pulses with said echoes whereby the images of said range marker pulses produce a line image bisecting said echo image.

25. A ground-controlled approach system as defined in claim 22 which also includes means for synchronizing said means for generating elevation marker pulses with said means for generating range marker pulses.

26. A ground-controlled approach system as defined in claim 22 which also includes means for synchronizing said means for generating azimuth marker pulses with said means for generating range marker pulses.

27. A ground-controlled approach system as defined in claim 22 which also includes means for synchronizing said means for generating elevation marker pulses with said means for generating range marker pulses, means for adjusting the time of generating said elevation marker pulses, said last means permitting the adjustment of the image of said elevation marker pulses for partial coincidence with the image of said echo, and a meter connected to said last means for indicating the sign and magnitude of said adjustment.

28. A ground-controlled approach system as defined in claim 22 which also includes means for synchronizing said means for generating azimuth marker pulses with said means for generating range marker pulses, means for adjusting the time of generating said azimuth marker pulses, said last means permitting the adjustment of the image of said azimuth marker pulses for partial coincidence with the image of said echo, and a meter connected to said last means for indicating the sign and magnitude of said adjustment.

29. A directional antenna system comprising an elevation antenna producing a highly directional fan-shaped elevation beam which is narrow in elevation and relatively wide in azimuth, an azimuth antenna producing a highly directional fan-shaped azimuth beam which is narrow in azimuth and relatively wide in elevation, said antennas and the planes of said two beams being electrically at right angles to each other, and instrumentalities for fanning said elevation beam up and down through a sector and said azimuth beam from side to side through a wider sector than the first mentioned sector, said instrumentalities including means for fanning said elevation and azimuth beams at the same periodic rate but in such a manner that when one of said beams is at the middle of its sector the other beam is at an end of its sector.

30. An antenna system for a radio pulse-echo detector including a base, an elevation mounting secured to said base for rotation in azimuth, an elevation antenna secured to said elevation mounting for rotation in elevation, an azimuth mounting secured to said base for rotation in azimuth, an azimuth antenna secured to said azimuth mounting for rotation in elevation, first motor means to oscillate the elevation antenna in elevation and the azimuth antenna together with its mounting in azimuth, said oscillations being simultaneous and in predetermined phase relationship, second motor means to swing both of said mountings and the antennas equal angular distances in azimuth, third motor means to swing the azimuth antenna in elevation, both of said swinging movements being accomplished without changing the said oscillatory movements, and means for periodically electrically energizing and de-energizing one antenna to transmit successive radio pulses, while the other antenna remains de-energized, during a quarter cycle of said oscillatory movements, and causing this operation of the two antennas to alternate during each quarter cycle of said oscillatory movements.

LUIS W. ALVAREZ.
LAWRENCE H. JOHNSTON.

REFERENCES CITED

The following references are of record in the file of this patent:

UNITED STATES PATENTS

| Number | Name | Date |
|---|---|---|
| 2,062,003 | Hammond, Jr. | Nov. 24, 1936 |
| 2,063,534 | Wallace | Dec. 8, 1936 |
| 2,231,929 | Lyman | Feb. 18, 1941 |
| 2,267,715 | Bowen | Dec. 30, 1941 |
| 2,298,476 | Goldsmith | Oct. 13, 1942 |
| 2,399,671 | Gage | May 7, 1946 |
| 2,405,231 | Newhouse | Aug. 6, 1946 |
| 2,407,898 | Norgaard | Sept. 17, 1946 |
| 2,421,747 | Engelhardt | June 10, 1947 |
| 2,433,381 | Marchand | Dec. 30, 1947 |
| 2,436,846 | Williams | Mar. 2, 1948 |

FOREIGN PATENTS

| Number | Country | Date |
|---|---|---|
| 108,556 | Australia | Sept. 14, 1939 |
| 543,638 | Great Britain | Mar. 5, 1942 |
| 546,021 | Great Britain | June 24, 1942 |